United States Patent
Kolawa et al.

(10) Patent No.: US 7,392,507 B2
(45) Date of Patent: Jun. 24, 2008

(54) MODULARIZING A COMPUTER PROGRAM FOR TESTING AND DEBUGGING

(75) Inventors: Adam K. Kolawa, Bradbury, CA (US); Chad E. Byers, San Luis Obispo, CA (US)

(73) Assignee: Parasoft Corporation, Monrovia, CA (US)

( * ) Notice: Subject to any disclaimer, the term of this patent is extended or adjusted under 35 U.S.C. 154(b) by 738 days.

(21) Appl. No.: 11/017,482

(22) Filed: Dec. 20, 2004

(65) Prior Publication Data
US 2005/0120276 A1 Jun. 2, 2005

Related U.S. Application Data

(63) Continuation of application No. 09/478,682, filed on Jan. 6, 2000, now Pat. No. 6,895,578.

(60) Provisional application No. 60/114,839, filed on Jan. 6, 1999.

(51) Int. Cl.
*G06F 9/45* (2006.01)
(52) U.S. Cl. .................................... 717/124
(58) Field of Classification Search ................ 717/124
See application file for complete search history.

(56) References Cited

U.S. PATENT DOCUMENTS

| | | | |
|---|---|---|---|
| 5,313,616 A | | 5/1994 | Cline et al. |
| 5,581,696 A | | 12/1996 | Kolawa et al. |
| 5,842,019 A | | 11/1998 | Kolawa et al. |
| 5,856,984 A | * | 1/1999 | Rushworth .................. 714/724 |
| 6,011,830 A | * | 1/2000 | Sasin et al. .............. 379/10.03 |
| 6,085,029 A | * | 7/2000 | Kolawa et al. ................ 714/38 |
| 6,332,213 B1 | | 12/2001 | Grossman et al. |

OTHER PUBLICATIONS

Auerbach, et al., "Mockingbird: Flexible Stub Compilation from Pairs of Declarations", IEEE, pp. 393-402, Jun. 1999.
Beizer, "Software Testing Techniques", Van Nostrand Reinhold Company, Chapter 1, pp. 1-14, 1986.

* cited by examiner

*Primary Examiner*—John Chavis
(74) *Attorney, Agent, or Firm*—Christie, Parker & Hale, LLP.

(57) ABSTRACT

A system and method for facilitating and simplifying testing and debugging of computer programs. is described A computer program is broken down to smaller components, such as, classes, functions, or objects, and then those smaller components are tested individually. Accordingly, specific aspects of the computer program can be effectively tested. The user can automatically perform a range of tests on a class or method when the class or method is compiled without integrating the class or method into a larger project.

24 Claims, 27 Drawing Sheets

| BUTTON | NAME | ACTION |
|---|---|---|
| 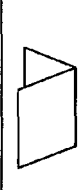 OPEN FILE(S) | OPEN FILE(S) | OPENS A FILE CHOOSER FROM WHICH YOU CAN SELECT ONE OR MORE FILES. OPENED FILES WILL BE DISPLAYED IN THE FILE LIST. |
| 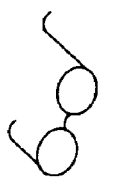 READ SYMBOLS | READ SYMBOLS | PARSES THE SELECTED FILE AND REPRESENTS ITS SYMBOLS IN THE SYMBOL TREE. |
| 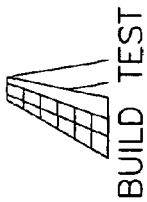 BUILD TEST | BUILD TEST | PARSES THE CURRENT FILE, READS ITS SYMBOLS, INSTRUMENTS IT IF NECESSARY, THEN COMPILES AND LINKS IT. |
| 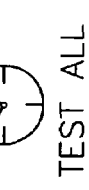 TEST ALL | TEST ALL | BUILDS AND TESTS ALL FILES CURRENTLY IN THE FILE LIST. |
| 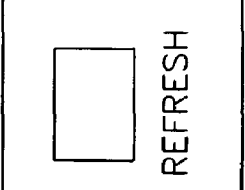 REFRESH | REFRESH | RECREATES YOUR SYMBOL TREE FROM ITS CURRENT SYMBOL REPOSITORY, CLOSES ALL EXPANDED NODES, AND DESELECTS THE CURRENTLY SELECTED NODE. IF THE FILE IS CLOSED, IT WILL CLEAR THE SYMBOL TREE AND OTHER TABS. |

| SOURCE CODE | TEST PROGRESS | RESULTS | TEST CASE EDITOR | STUB TABLES | SUPPRESSIONS |

FILE: C:\cpptest\examples\ex05.cpp

```
1   // This example illustrates how to test class methods
2   // and functions which have class as a parameter
3
4   class Integer
5   {
6   public:
7       Integer(int i) : _i(i) {}
8       void setInt(int i) { _i=i; }
9       int getInt() { return _i; }
10  private:
11      int _i;
12  };
13
14  int getInt(Integer I)
15  {
16      return I.getInt();
17  }
```

FIG. 7B

| SOURCE CODE | TEST PROGRESS | RESULTS | TEST CASE EDITOR | STUB TABLES | SUPPRESSIONS |
|---|---|---|---|---|---|
| ○ △ □ 00 | | | | | |
| RECORD PLAY STOP PAUSE | | | | | |

| | GLOBAL SYMBOLS | METHODS | | | |
|---|---|---|---|---|---|
| ▲ | void bubble_sort1(int*, int) | | | | |
| | void bubble_sort2(int*, int) | | | | |
| | void simple_insertion_sort1(int*, int) | | | | |
| | void simple_insertion_sort2(int*, int) | | | | |
| | void sort1(int*, int) | | | | |

FIG. 7E

| SOURCE CODE | TEST PROGRESS | RESULTS | TEST CASE EDITOR | STUB TABLES | SUPPRESSIONS |
|---|---|---|---|---|---|

| FUNCTION | STUB TYPE |
|---|---|
| void bubble_sort1(int*, int) | ORIGINAL FUNCTION |
| void bubble_sort2(int*, int) | C++TEST GENERATED |
| void simple_insertion_sort1(int*, int) | C++TEST GENERATED |
| void simple_insertion_sort2(int*, int) | USER DEFINED |
| void sort (int*, int) | ORIGINAL FUNCTION / C++TEST GENERATED / ORIGINAL FUNCTION |

| ADD CASE | REMOVE CASE | CHANGE CASE | SAVE TABLE | SAVE CONFIGURATION |

*FIG. 7I*

| OUTPUT | EDITOR | | | |
|---|---|---|---|---|
| | ADD TEST CASE | CHANGE TEST CASE | REMOVE TEST CASE | REMOVE ALL TEST CASES |

ARGS AND RETURN: void bubble_sort2(int*, arr=(...), int=size=[    ])

PRE CONDITIONS:

POST CONDITIONS:

*FIG.10B*

| OUTPUT | EDITOR |
|---|---|
| | ADD TEST CASE | CHANGE TEST CASE | REMOVE TEST CASE | REMOVE ALL TEST CASES |

INSERT VALUE:  | INT_MIN | | -1 | | 0 | | 1 | | INT_MAX | | rand() |

ARGS AND RETURN:    int= rand()    strlen( char const * str= {...})

PRE CONDITIONS:

POST CONDITIONS:

FIG.12B

LINE THAT WAS    NUMBER OF TIMES
ALREADY COVERED    LINE WAS EXECUTED

COVERAGE FOR VOID BUBBLE SORT2(int*,int)

FILE: E:\home\centaur\sergey\dv\modtest\examples\ex04.cpp

```
20
21
22
23
24   //correct version of bubble sort
25   void bubble_sort2(int*arr,int size)
26 9 {
27 11    for(int i=0;i<size;++i){
28 3      for(int j=0;j<size;-i-1;++j){
29 1        if(arr[j]>arr[j+1]){
30            int temp=arr[j+1];
31            arr[j+1]=arr[j];
32            arr[j]=temp;
33          }
34 1      }
35 8    }
36   }
37   //this function has an overwrite error
```

MODULARIZING A COMPUTER PROGRAM FOR TESTING AND DEBUGGING

CROSS-REFERENCE TO RELATED APPLICATION

This patent application is a continuation application of U.S. patent application Ser. No. 09/478,682, filed Jan. 6, 2000 now U.S. Pat No. 6,895,578, which claims the benefit of the filing date of U.S. Provisional Patent Application Ser. No. 60/114,839, filed Jan. 6, 1999 and entitled "MODULARIZING A COMPUTER PROGRAM FOR TESTING AND DEBUGGING", the entire contents of which are hereby expressly incorporated by reference.

FIELD OF THE INVENTION

The present invention relates to a computer system and method for testing and debugging computer programs. More specifically, the present invention is directed to a method and system for breaking down a computer program for efficient testing.

BACKGROUND OF THE INVENTION

Reliable and successful software is built through sound, efficient and thorough testing. However, software testing is labor intensive and expensive and accounts for a substantial portion of commercial software development costs. At the same time, software testing is critical and necessary to achieving quality software. Typically, software testing includes test suite generation, test suite execution validation, and regression testing.

Test suite generation involves creating a set of inputs which force the program or sub-program under test to execute different parts of the source code. This generated input set is called a "test suite." A good test suite fully exercises the program's functionality including the individual functions, methods, classes, and the like.

Test suite execution validation involves executing the program using the test suite and evaluating the program's outputs to validate the program's correctness. Errors detected during this task are corrected and the process is repeated until all tests execute correctly. Regression testing involves verifying new versions of the program by running the program against the test suite and comparing its outputs to the expected outputs from the original program. This task ensures that changes in the program source code do not introduce new defects.

Historically, test suite generation, test suite execution validation and regression testing were manual tasks. Only efforts to automate regression testing have proven successful. Nevertheless, as the size and complexity of software programs increase, the need to automate test suite generation and test suite execution validation becomes more important. It is difficult to test all the methods and functions in a complex program and be able to isolate a single faulty function within the complex program.

However, the difficulty in generating a test suite that executes most of the source code increases as the number of functions that call other functions (nested functions) increases within the program under test. A significant number of functions need to be executed to force the program to test a single function that calls those significant number of functions. Furthermore, during development of a complex program by a team of programmers, functions and methods are developed (typically, by different individuals) that may call other parts of the program that has not been developed yet. To be able to thoroughly test these newly developed functions and methods, the programmers need to wait for the whole project to be completed.

A debugger may be used to step through the program under test to facilitate fixing of problems. However, the debugger only follows the path of execution. However, when the users need to go through small modules of the program, they need to define the path by specifying the functions to be called, the arguments, and the values to be returned.

Therefore, what is needed is an automated test tool for assisting programmers in testing software programs that is capable of covering all of the program under test by breaking down the program to smaller components and then test those smaller components individually. Furthermore, what is needed is a system and method for testing a class, function, routine, or method as soon as it is compiled without integrating it into a larger project.

SUMMARY OF THE INVENTION

The present invention describes a software tool for facilitating and simplifying testing and debugging of computer. programs. A computer program is broken down to smaller components, e.g., classes, functions, or objects, and then those smaller components are individually tested. Accordingly, specific aspects of the computer program can be effectively tested. The user can automatically perform a range of tests on a class or method when the class or method is compiled, preferably without building a harness or integrating the class or method into a larger project.

The software tool of the present invention modifies the computer program under test to replace externally called functions with automatically generated stubs or user-defined stubs. For example, for every function in the computer program under test, the tool replaces all the calls to external functions by the function under test with predetermined functions (generated stubs) or user-specified functions (subs). The predetermined or user-specified functions have the same signature as the replaced external functions. In this way, the tool controls all the inputs to the function under test.

Still other embodiments of the present invention will become readily apparent to those skilled in the art from the following detailed description, wherein is shown and described only embodiments of the invention by way of illustration of the best modes contemplated for carrying out the invention. As will be realized, the invention is capable of other and different embodiments and its several details are capable of modification in various obvious respects, all without departing from the spirit and scope of the present invention. Accordingly, the drawings and detailed description are to be regarded as illustrative in nature and not as restrictive.

BRIEF DESCRIPTION OF THE DRAWINGS

FIG. 4 is an exemplary list of commands in a tool bar in accordance with one embodiment of the present invention;

FIGS. 7A-7J are exemplary Tabs in accordance with one embodiment of the present invention;

FIGS. 10A-10C are exemplary screen for adding a test case in accordance with one embodiment of the present invention;

FIGS. 12A-12B are exemplary screens for viewing test coverage in accordance with one embodiment of the present invention;

DETAIL DESCRIPTION

Figure 1:
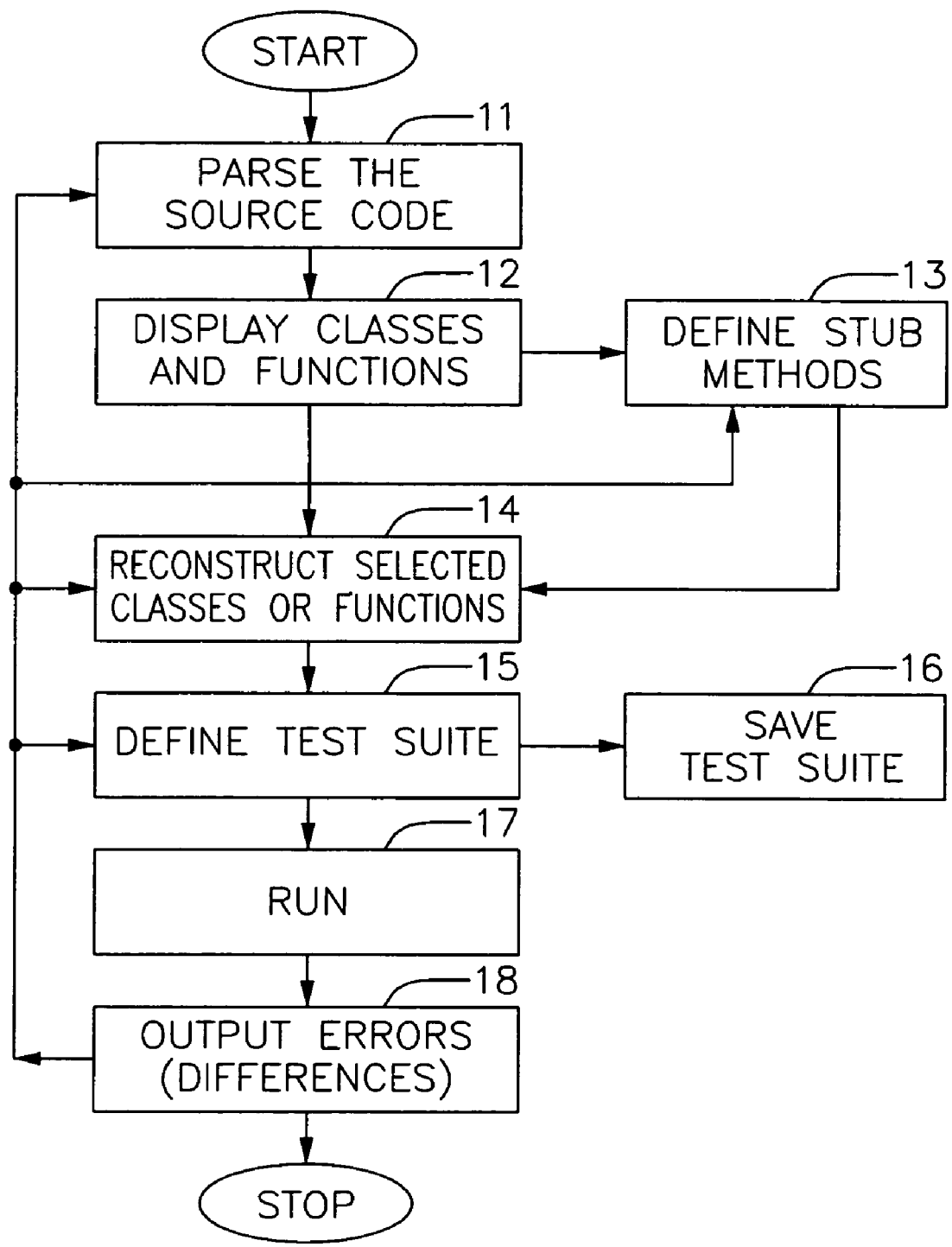
FIG. 1 is a flow diagram of a method for testing a computer program in accordance with one embodiment of the present invention.

The present invention is a software tool for facilitating and simplifying testing and debugging of computer programs. The computer program under test is broken down to smaller components, e.g., classes, functions, or objects, and then those smaller components are individually tested, preferably, without the need for integrating the smaller components into a larger project. The types of tests performed by the tool include; testing a class construction (white-box testing); testing the class functionality (black-box testing); regression testing; testing whether the modifications have corrected errors or introduced new problems into the code; and the like. Furthermore, the present invention can monitoring test coverage for the program under test.

The tool is capable of performing the following tasks: opening the file(s) or project to be tested test, building a test executable, customizing automatic test settings, adding or modifying test cases, configuring stubs, running the test, viewing the test output and results, validating the output, editing the source code to correct problems found, refreshing the symbol tree to reflect source code modifications, adding additional test cases or modifying existing test cases (optional), performing regression testing, and the like.

The tool is also capable of providing the following features in a GUI: viewing the source code, saving the files and parameters as a project, sharing test parameters with a team member, excluding certain classes or methods from the test, detecting runtime errors with other plug-in debuggers such as Insure++™, enforcing coding standards with other plug-in rule checker applications such as CodeWizard™, and the like.

In one example, a class is reconstructed by removing all the source code that is not related to that class. In another example, a class is reconstructed by ignoring all the source code that is not related to that class. Each line of source code that is reconstructed is preceded by a pointer to relate it to the original source code. The class information that is reconstructed includes: the class definition, the class member function definitions, the class static member definitions, the types that are used as data members in the class, and the types that are used as parameters to member functions. Accessor functions that return a reference to the data member are written for all data members in a class. These functions are then made available to the public interface of the class for public access. Also, all the enumerations are promoted to the public access and all un-named enumerations are named.

The tool outputs the state of the class or function under test and that information can be saved. During the execution of the class or the function testing, the current status of the class or the function is examined and compared to the known value previously saved by the user or obtained from previous tests. If the current value differs from the expected value a message is sent to the user informing them of the discrepancy. Examples of the items that are compared are object member values, class static member values, and the like.

Stubs are the functions created to replace the actual functions. In one embodiment, default stubs are created for every method declared or defined in the user code. The default stubs are created with the same signature as the original functions. In one embodiment, the default stubs are referred to as "C++ Test generated" stubs in the GUI. Other types of stubs could be included with the instrumented source, for example, user defined stubs, where the user can provide a function body may be created. The user defined stubs could be a simplified version of the original function or the original function itself if it was defined in a file other then one under testing. Typically, stubs are not tested, but are executed if calls to the functions which they replace occur.

For each function or class under test, a separate list of related functions to be stubbed out is maintained in a database and can be displayed in a Graphical User Interface (GUI). The users can define a specific behavior when a function is called by writing their own code for the stubs in a template or prototype function provided to them (i.e., user defined stubs). The user-defined information is kept in a separate file, compiled as a separate object and then linked to the program. Users can also define the arguments to call a function with, and define the stubs so that they could affect the running of the function internally. Users can define input/output parameters for the generated stubs (i.e. stub tables) as well.

A debugger can be called to step through the code to facilitate fixing of any problems in the code. However, the debugger only follows the path of execution while this tool allows the users to define the path by specifying the function to be called, the arguments, and the values to be returned. This allows the users to go through small modules of the program and supply all the conditions they want to test.

FIG. 1 is an example of one embodiment of the tool. The source code under test is parsed in block 11. Classes and functions within the source code are then identified and displayed in block 12. If the users wish to define specific behavior for classes and functions, they do so in block 13. A selected class or function is then reconstructed by removing (or ignoring) all the non-related code as shown in block 14. In block 15, a test suit is defined for the reconstructed class or function and if desired, that test suit is saved as shown in block 16. In block 17, the modified class or function is run, and the errors are reported in block 18.

Figure 2:
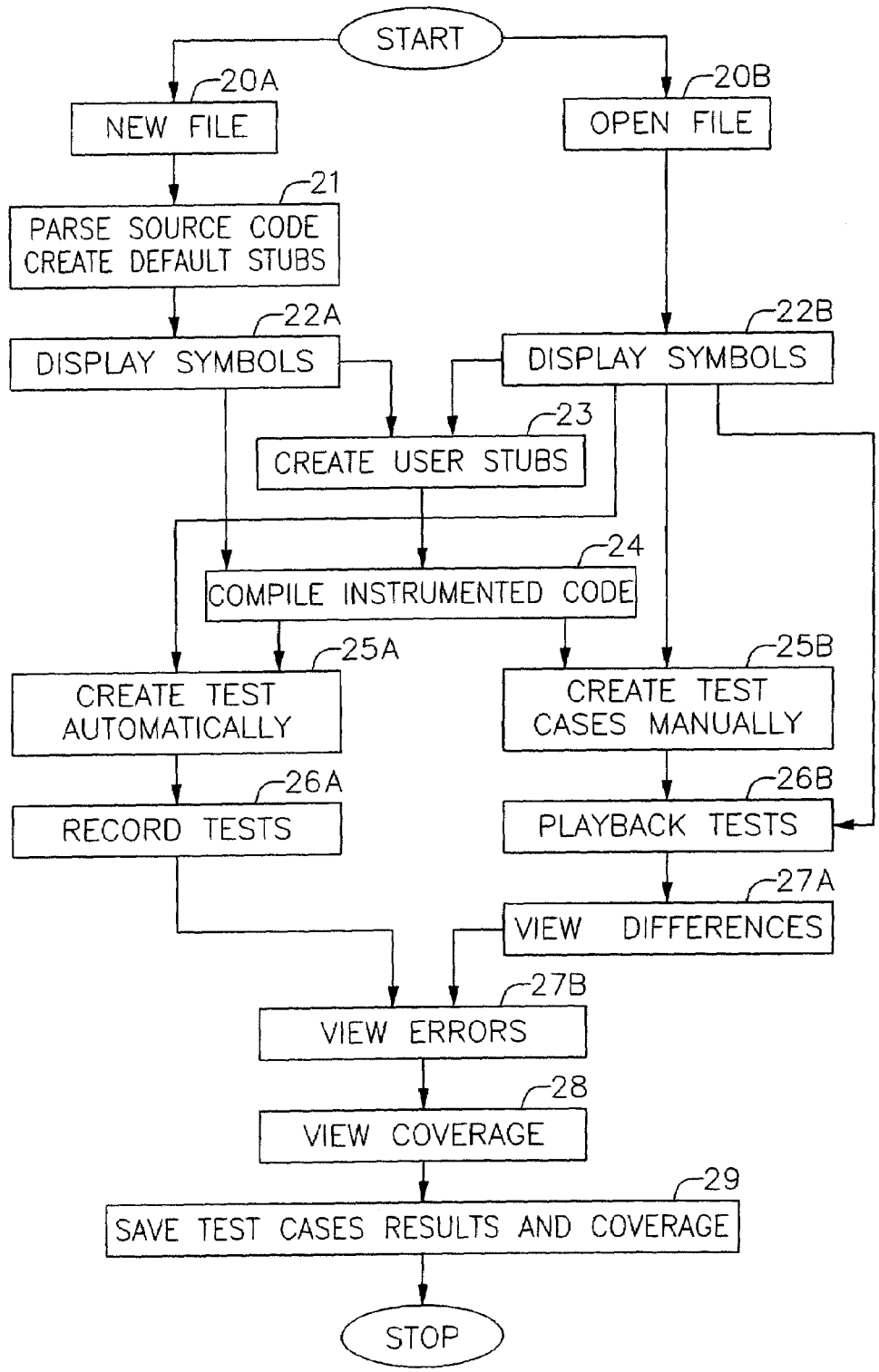
FIG. 2 is another flow diagram of a method for testing a computer program in accordance with one embodiment of the present invention.

FIG. 2 illustrates a more detailed exemplary flow chart for one embodiment of the present invention. If the file is a new file, the new file is created in block 20A. The source code file is parsed and recreated and for each method in the file, a default stub is created in block 21. The file symbols (for example, namespaces, classes, methods, class members, enums, typedefs, and the like) are displayed in blocks 22A and 22B to be selected by the user to create test stubs. As shown in block 23, within the GUI, the user has an option to choose the type of stub to be used: "Original Function" (if the body of that function was defined in the file), "C++Test generated stub", or "User stub". If the user chooses the "User stub", the signature of the function that its body needs to be filled is provided to the user. This may be a simplified function that mimics the behavior of the original function, or the original function itself if it was not defined in the tested file.

The stubs are created during the instrumentation process. In one embodiment, whenever the parser sees a function declaration or function definition it creates a stub. The actual function which is executed during the test preferably has a switch statement to allow execution of the original function (if any), system generated stub, or user defined stub (if any) depending on the "Stub configuration".

In block 24, the instrumented code is compiled and test cases are automatically or manually created as shown in blocks 25A and 25B, respectively. The tests are recorded in block 26A. The tool generates automatic test cases and runs the entered test cases when a test is recorded. For each method, tests may be automatically created. For instance, arguments to the function are automatically generated and the class member variables are automatically initialized. For each primitive type, boundary conditions and random values are tested. For example, for the function with one integer argument, the following values are used {MIN_INT, −1, 0, 1, MAX$_{13}$ INT, rand()}. Preferably, all possible combinations of these values are used. The automatic test values are customizable, for example, users can disable any of them, and provide their own values.

The test may be played back, as shown in block 26B. When a test is played back, the tool replays the same tests already used when the test was first recorded and new tests are not automatically generated. The user may view the differences between each played test using the GUI, as shown in block 27. In blocks 27B and 28, the errors and test coverage may be viewed respectively. The user has an option to turn on the coverage analysis, that is, keeping track of which code blocks of the program under test have been executed. This is preferably done before the file is instrumented. As a result of turning on the coverage analysis, test executable sends line numbers from the original source to the GUI as the lines of code are executed (print statements), the GUI then reads these line numbers and stores the number of times each line of code is executed.

Figure 3:
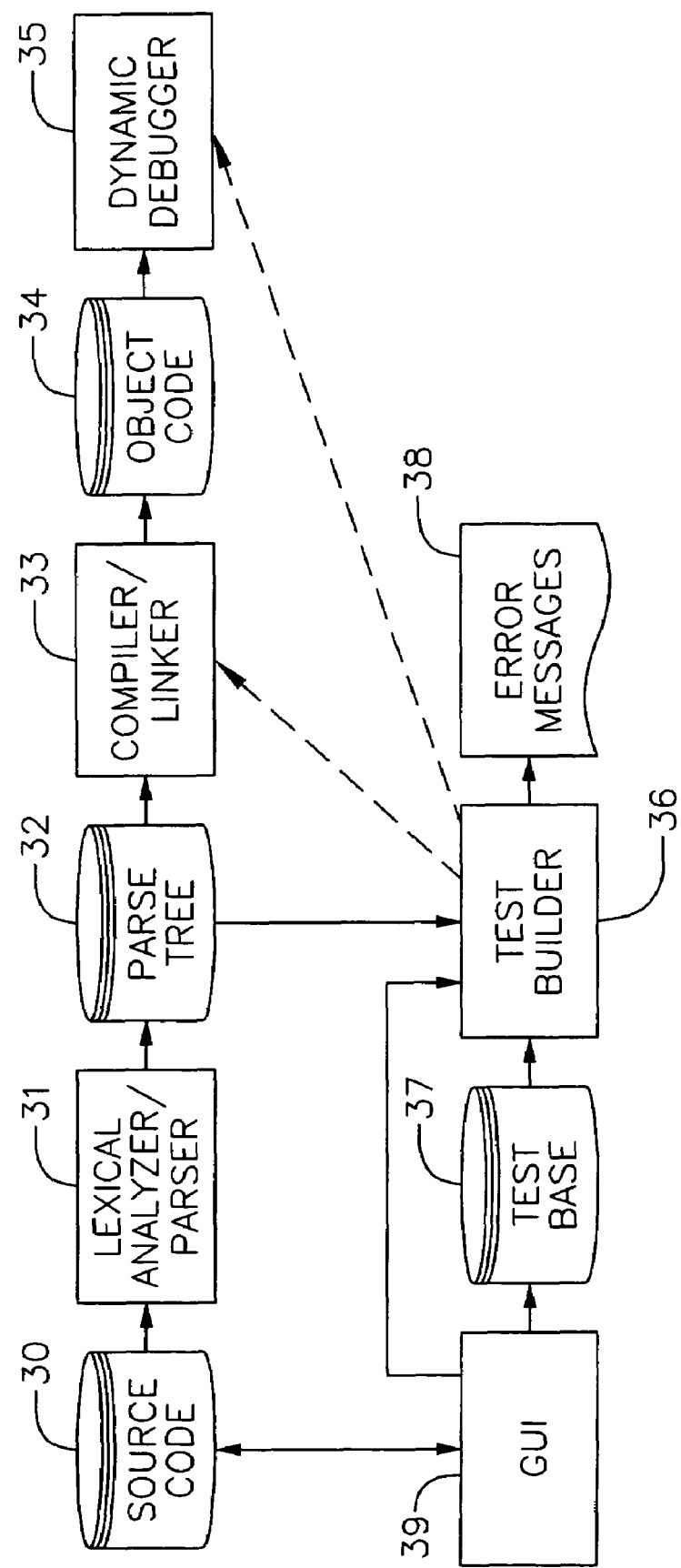
FIG. 3 is a functional block diagram of a system for testing a computer source program constructed in accordance with one embodiment of the present invention.

In the exemplary embodiment of FIG. 3, the source code 30 is preferably organized into files which are stored on a secondary storage device (not shown). Source code 30 includes a series of programming language instructions.

Source code 30 is received as input to a lexical analyzer/parser 31 which is conventional in the art. The lexical analyzer scans the source code 30 and groups the instructions or relationships into tokens. The parser performs a hierarchical analysis which groups the tokens into grammatical phrases that are represented by a parse tree 32. Each instruction is represented in the parse tree 32 by at least one node with interconnecting paths representing dependencies between each token.

The parse tree 32 is used by both a compiler/linker 33 and test builder 36. The compiler/linker 33 transforms the parse tree 32 into executable object code 34 and is conventional in the art. The compiler/linker 33 translates the phrases stored in the parse tree 32 into individual object modules (not shown) and combines them with test stubs to create object code 34.

The resulting executable computer program, as embodied in the object code 34, may be dynamically tested with the dynamic debugger 35 for identifying runtime errors. The dynamic debugger is conventional in the art. An example of such a dynamic debugger 35 is the INSURE™ dynamic debugger product manufactured by Parasoft Corporation, Monrovia, Calif.

The parse tree 32 is instrumented by the test builder 36 prior to compilation by the compiler/linker 33 for automatically reconstructing selected classes or functions according to the present invention. The GUI 39 which is constructed in accordance with the present invention provides the user with different menus and options to create test stubs and perform different test functions, as further described below.

The test builder 36 accesses the test base 37 that stores a set of test stubs for testing concerns, as further described herein below. Each stub in the test base 37 may be used by the test builder depending on the instructions provided by the user through the GUI 39.

In one embodiment, the GUI is comprised of the following components:

Menu Bar: Contains commands that open and manage files and tests.

Tool Bar: Provides access to the most common commands used to open and manage files and tests.

Shortcut (pop-up) Menus: Options depend on the location of the shortcut menu. In general, these menus provide a quick way to perform an action related to the area or item containing the shortcut menu. Most shortcut menu items allow the user to move between tabs, as well as perform additional actions.

File List: Allows users to select which of the opened files to work with.

Symbol Tree: Allows users to see file's structure and to select which symbol to work with.

Source Code Tab: Displays the current file's source code. If a method is selected in the Symbol tree, that method is preferably highlighted.

Test Progress Tab: Lets users record and replay tests. If a user is testing a single method, lets the user attach a debugger.

Results Tab: Displays test results.

Test Case Editor: Allows users to create new test cases, and view and edit existing user-defined or automatically generated test cases. Uses Editor tab.

Editor Tab: Creates test cases and stub tables. Works with Object View Tree Editor.

Object View Tree Editor: Allows users to enter values for objects.

Stub Tables Tab: Allows users to view and modify stub types, enter their own stubs, and create stub tables for the tool generated stubs. Uses Editor Tab.

Suppressions Tab: Allows users to determine which classes and methods are tested.

Output tab: Displays all the tool's output, including build information and testing information.

Global Settings Panel: Allows users to determine settings (specially automatic test settings) that are applied to all tests.

Current Settings Panel: Allows users to determine settings (specially automatic test settings) that are applied to the current file, class, or method.

In one embodiment, the menu bar includes commands that open and manage files and tests. For example, the following menus are included in the menu bar:

File Menu

Open File(s): Opens a file chooser from which the user can select one or more files. Opened files is displayed in the File List.

Open DevStudio Project: Opens a file chooser from which the user can select a DevStudio project.

Close File(s): Closes all files currently in the File List.

Edit Source: Allows editing a file currently selected in the File List. When this command is selected, the file is opened in the editor specified in the Global Settings panel.

Read Symbols: Prompts the tool to parse the selected file and represent its symbols in the symbol tree.

Recent Files: Allows opening a recent file. Preferably, includes the six most recent files.

Recent DevStudio Projects: Allows opening a recent DevStudio Project. Preferably, includes the six most recent projects.

Exit: Closes the tool.

Project Menu

New Project: Allow naming a new project

Open Project: Opens a file chooser that lets the user open a saved project.

Save Project: Save a new or existing project.

Delete Project: Deletes the current project.

Tests Menu

Build Test: Parses the current file, reads its symbols, instruments it if necessary, then compiles and links it.

Test File(s): Opens a file chooser that lets the user open one or more file(s), then automatically builds and tests the selected file(s).

Test DevStudio Project: Opens a file browser that lets the user open a DevStudio Project, then automatically builds and tests the project's files.

Test All: Builds and tests all files currently in the File List.

Use Insure++: Tells the tool to use Insure++™ (or other debuggers) to perform runtime error detection on all tests.

Code Instrumentation: Tells Insure++™ (or other debuggers) to use full Source Code Instrumentation on all tests conducted Insure Panel: Launches the Insure++™ (or other debuggers) Control Panel.

Use CodeWizard: Telss the tool to user CodeWizard™ to enforce coding standards.

Enable Coverage: Tells the tool to generate coverage information on all tests.

Show Coverage: Launches a window that displays coverage information.

Clear Coverage: Removes current coverage information from the Coverage window.

Options Menu

Global Settings: Opens the Global Settings panel which lets the user specify editor options, build properties, and automatic test settings for all tests.

Current Settings: Opens the Current Settings panel which lets the user specify build properties and automatic test settings for the current file, class, or method.

Help Menu

About: Displays the tool's version number and contact information.

Online Help: Opens the online User's Guide.

FIG. 4 depicts an exemplary tool bar including commands with corresponding icons. The exemplary tool bar of FIG. 4 includes the following commands:

Open file(s): Opens a file chooser from which the user can select one or more files. Open files are displayed in the File List.

Read Symbols: Parses the selected file and represents its symbols in the Symbol tree.

Build Test: Parses the current file, reads its symbols, instruments it if necessary, then compiles and links it.

Test All: Builds and tests all files currently in the File List.

Refresh: Recreates the Symbol tree from its current symbol repository, closes all expanded nodes, and deselects the currently selected node. If the file is closed, this command clears the Symbol tree and other tabs.

Figure 5:
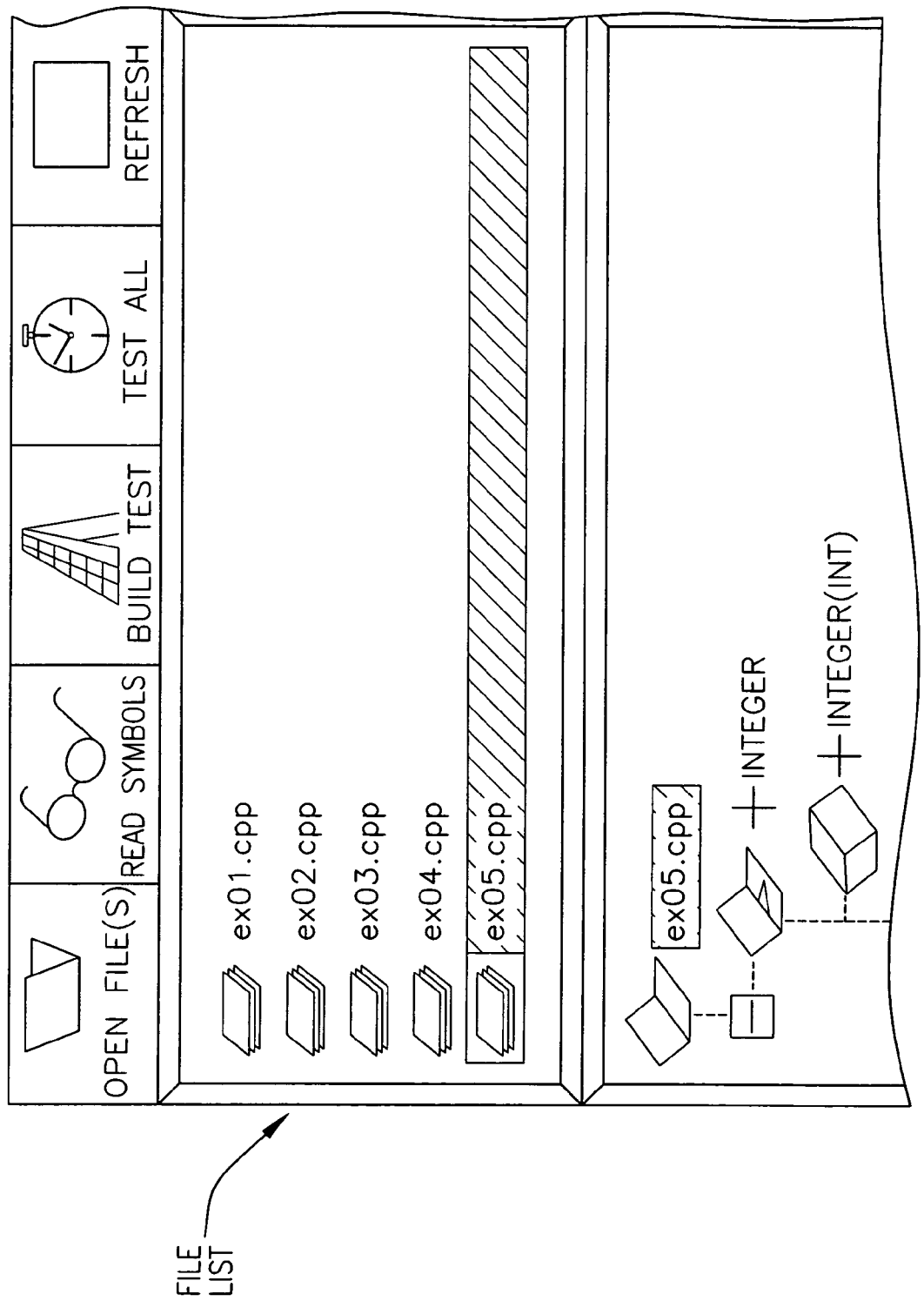
FIG. 5 is an exemplary File List in accordance with one embodiment of the present invention.
Figure 6:
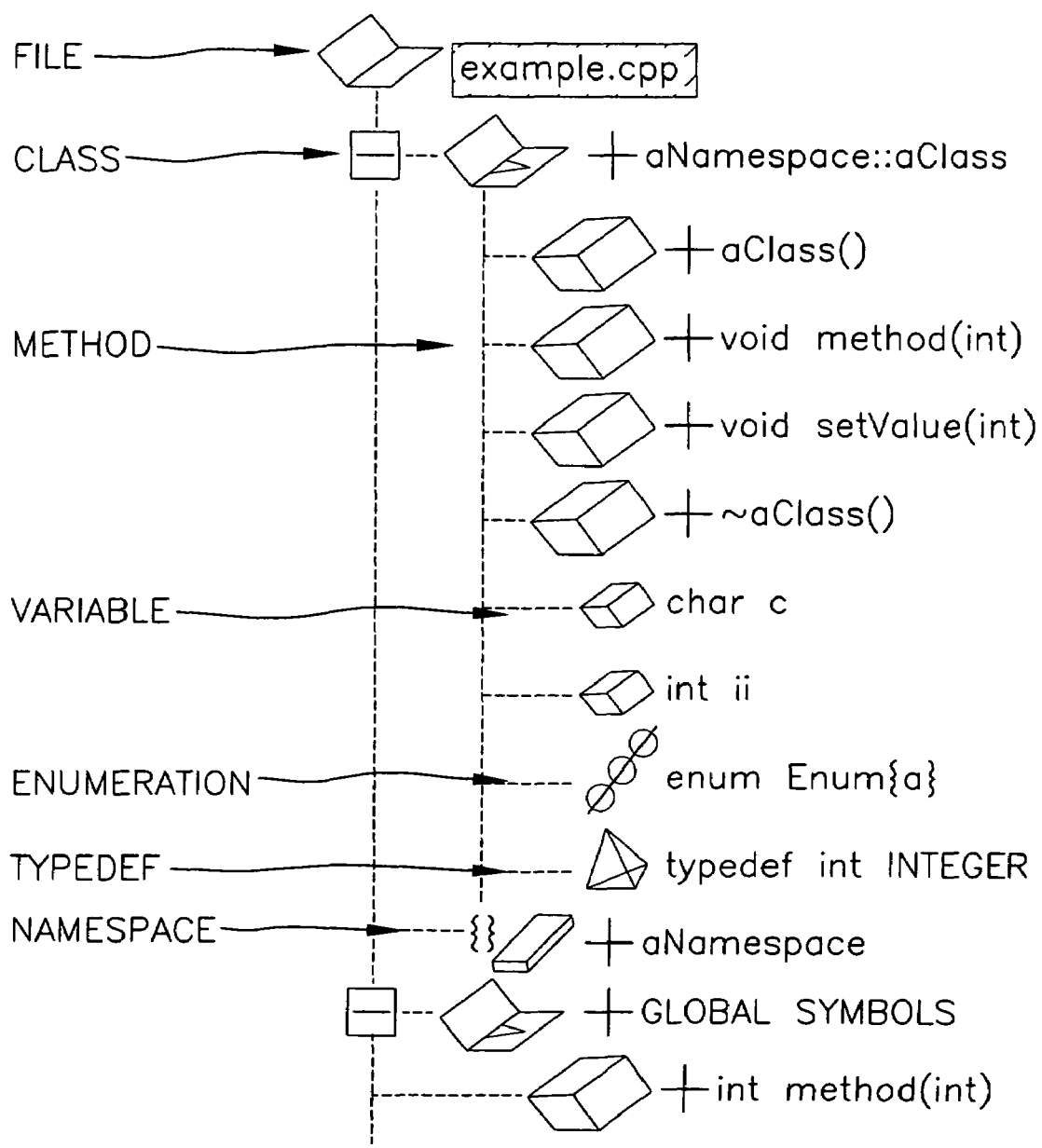
FIG. 6 is an exemplary Symbol Tree in accordance with one embodiment of the present invention.

As shown in FIG. 5, the File List includes all the opened files. This list is used to indicate the file that the user wants to work with or apply a certain action, such as, Read Symbol or Build File. The Symbol tree represents all the symbols in a given file. The Symbol tree is used to control which file, class, or method the user wants to perform an action on. The symbols represented by the Symbol tree are shown in FIG. 6. Public symbols, protected symbols, and private symbols are preferably depicted by different colors. If an include file is defined in a file, it will be included in the Symbol tree.

A Symbol tree can be restored to its original (unexpanded and deselected) state, by clicking the Refresh tool bar button. The tool then recreates the Symbol tree from its current symbol repository, closes all expanded nodes, and deselects the currently selected node. If the file is closed, this button will clear the Symbol tree and other tabs. If the user has made changes to the source file and likes the Symbol tree to reflect these changes, the user may click the Read Symbols tool bar button the tool then parses and instruments the files, then recreate the Symbol tree and repository.

As shown in FIG. 7A, the source code tab lets the user view the source code of any file currently in the File Tree, or of any file that its name and path are entered in the File field. If the tool has build a file or read its symbols, the user can use this tab to find and highlight a certain method. The user can tailor the source code viewer's properties to meet the standards to be used.

Figure 7C:
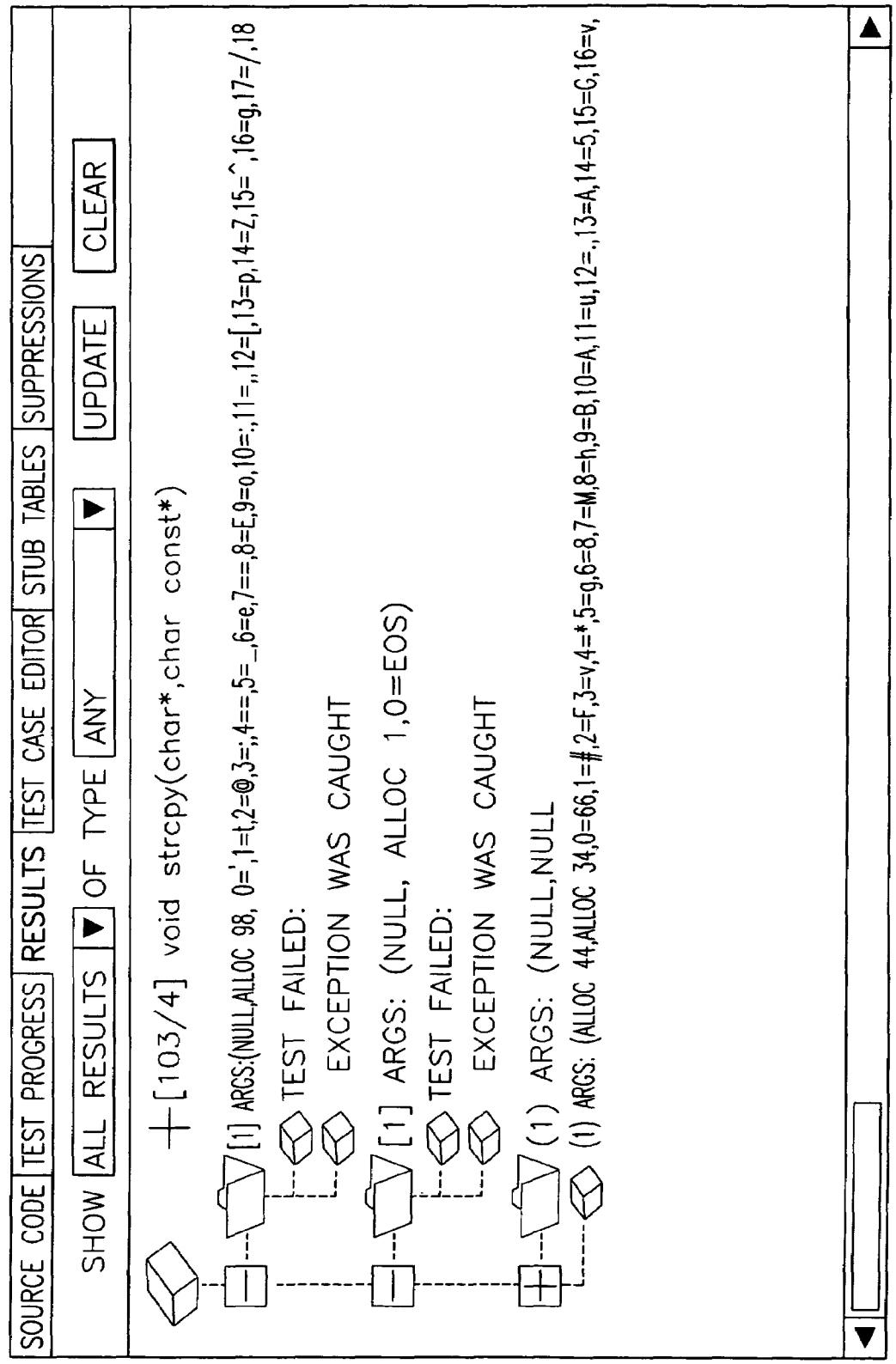
Figure 7D:
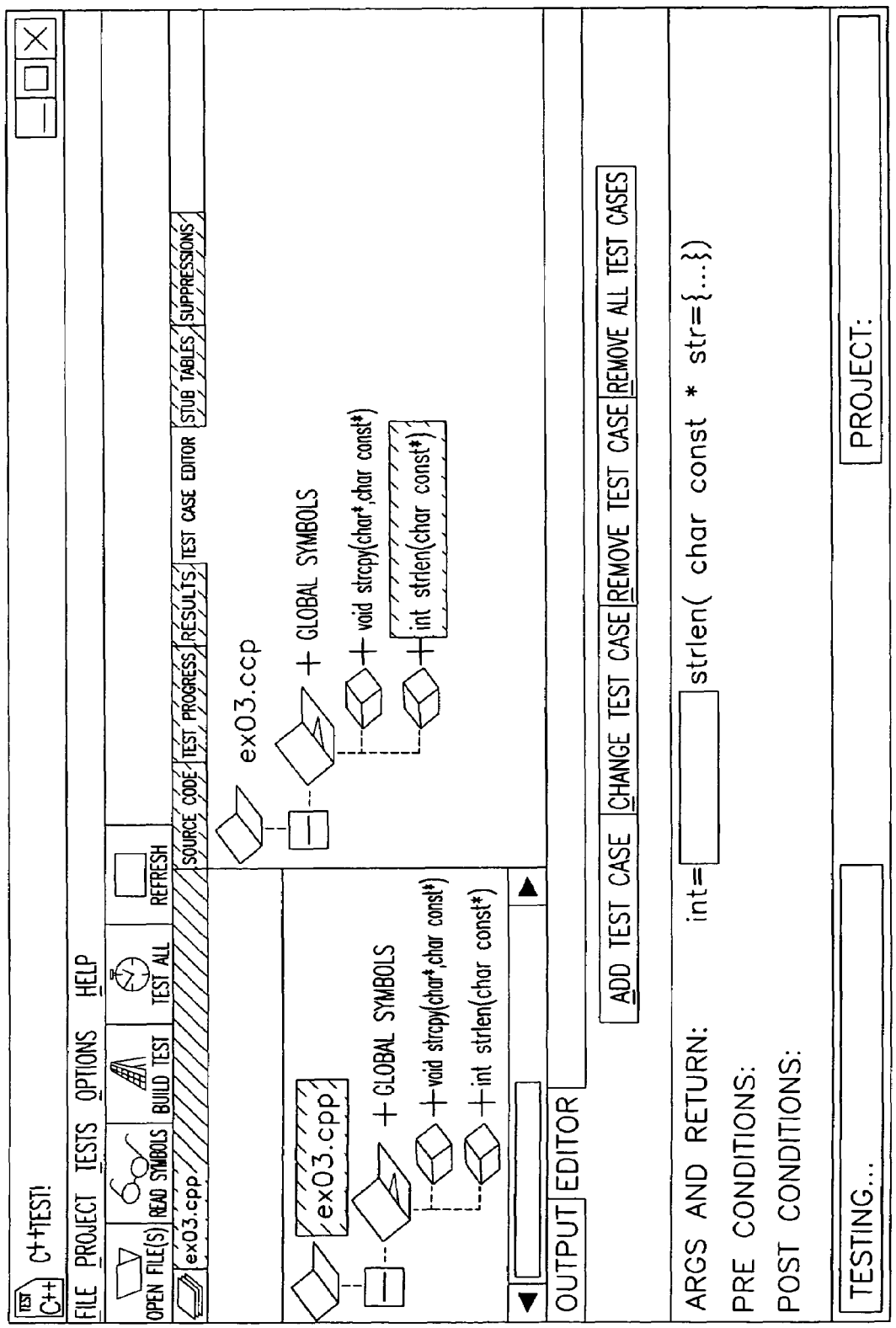
Figure 7F:
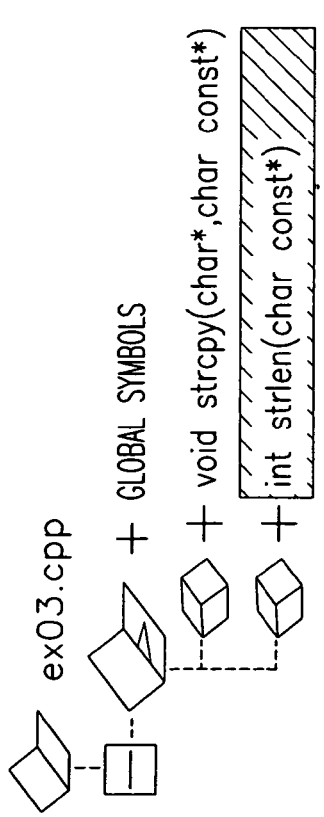
Figure 7G:
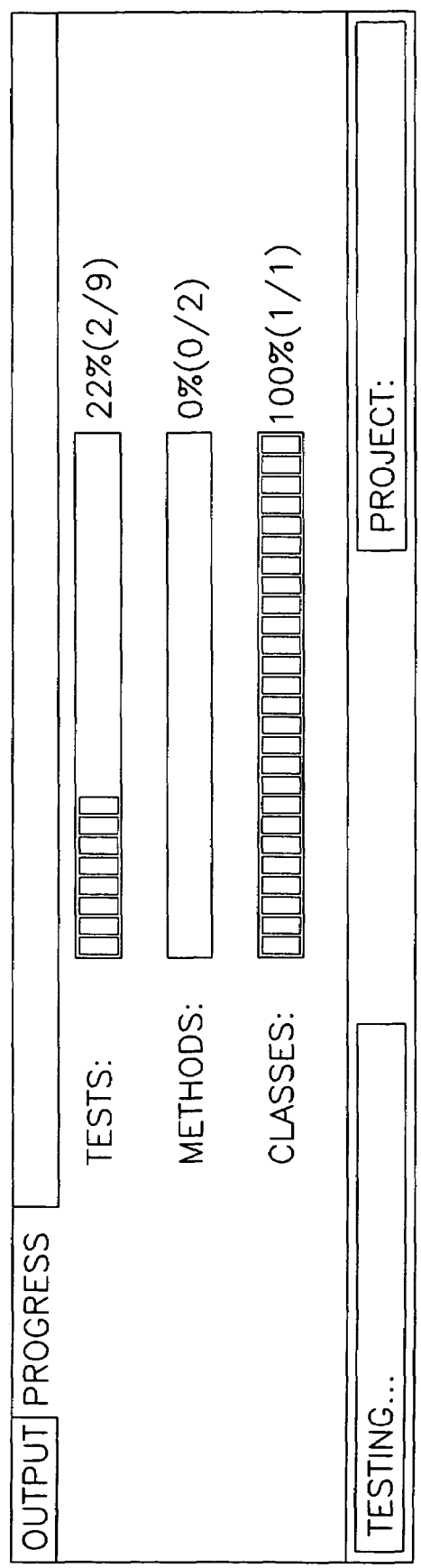

FIG. 7B illustrates an exemplary Test Progress Tab. The Test Progress tab allows recording, replaying, stopping, or pausing any test. It also indicates what method is currently being tested by placing an indicator, such as a green arrow, to the left of that method. An exemplary Results tab is shown in FIG. 7C. The upper Results tab, along with the lower Results tab, display all test cases and their outcomes. As depicted in FIG. 7D, the Test Case Editor tab lets the user create, view, and edit test cases. The Stub Tables tab of FIG. 7E lets the user determine what type of stub is used, enter user-defined stubs, and create stub tables. The Suppressions tab of FIG. 7F allows the user to control exactly which classes and methods are tested. As shown in FIG. 7G, the Progress tab displays information about test progress. While a test is being performed, the user can monitor the test progress in the Progress tab located within the GUI.

Figure 7H:
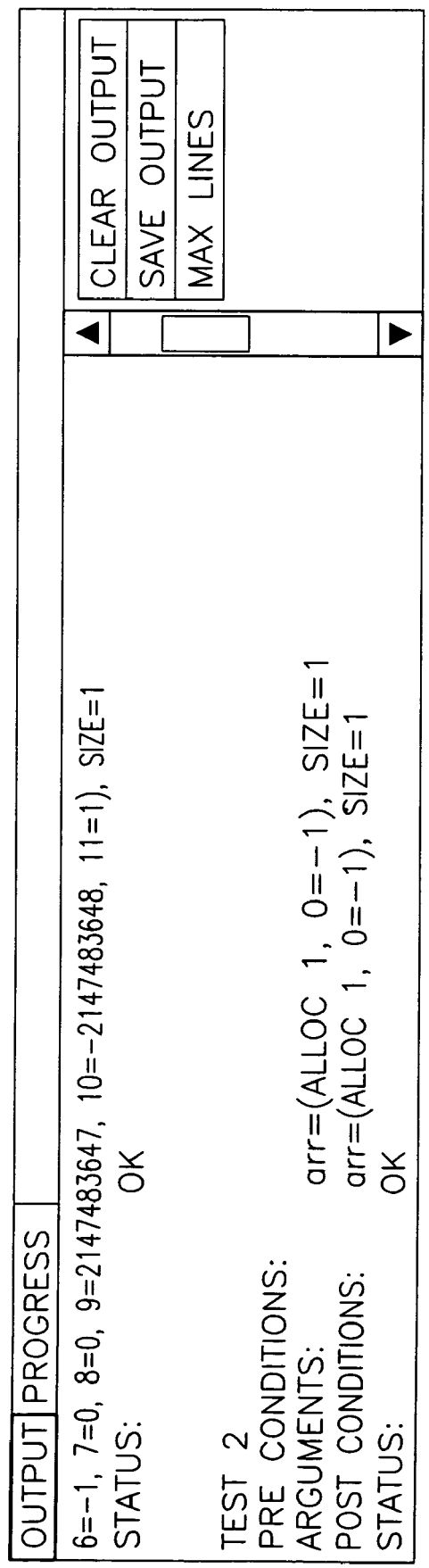

FIG. 7H shows an exemplary Output tab. This tab displays all build and test outputs. It is available at the bottom of the GUI during or after a build or test. To save this tab's content as a text file, the user may click Save Output, then specify where to save the output. To clear this tab's output, the user may click Clear Output. To change the maximum number of lines that this tab contains, the user clicks Max Lines, then chooses the desired number of lines in the dialog box that opens. FIG. 7I shows an exemplary Editor tab. The Editor tab is used to enter test cases in the Test Case Editor, as well as to create stub tables in the Stub Tables tab.

In one embodiment, the software tool of the present invention includes two similar settings panels: the Global Settings panel and the Current Settings panel. Each panel lets the user specify editor, build, and automatic test settings. Preferably, by default, settings in the Global Settings panel are applied to all files, classes, and methods under test. If the user wants to create unique settings for a certain file, class, or method, select the appropriate symbol in the symbol tree, then user utilizes the Current Settings panel.

The user can open the Global Settings panel by choosing Options> Global Settings; to open the Current Settings panel, select the file, class, or method in the symbol tree, then choose Options> Current Settings. Each Settings panel has two available tabs: Properties and Test Configuration. The Properties panel is preferably only available in the Current Settings panel if this panel has been opened for a file.

Figure 7J:
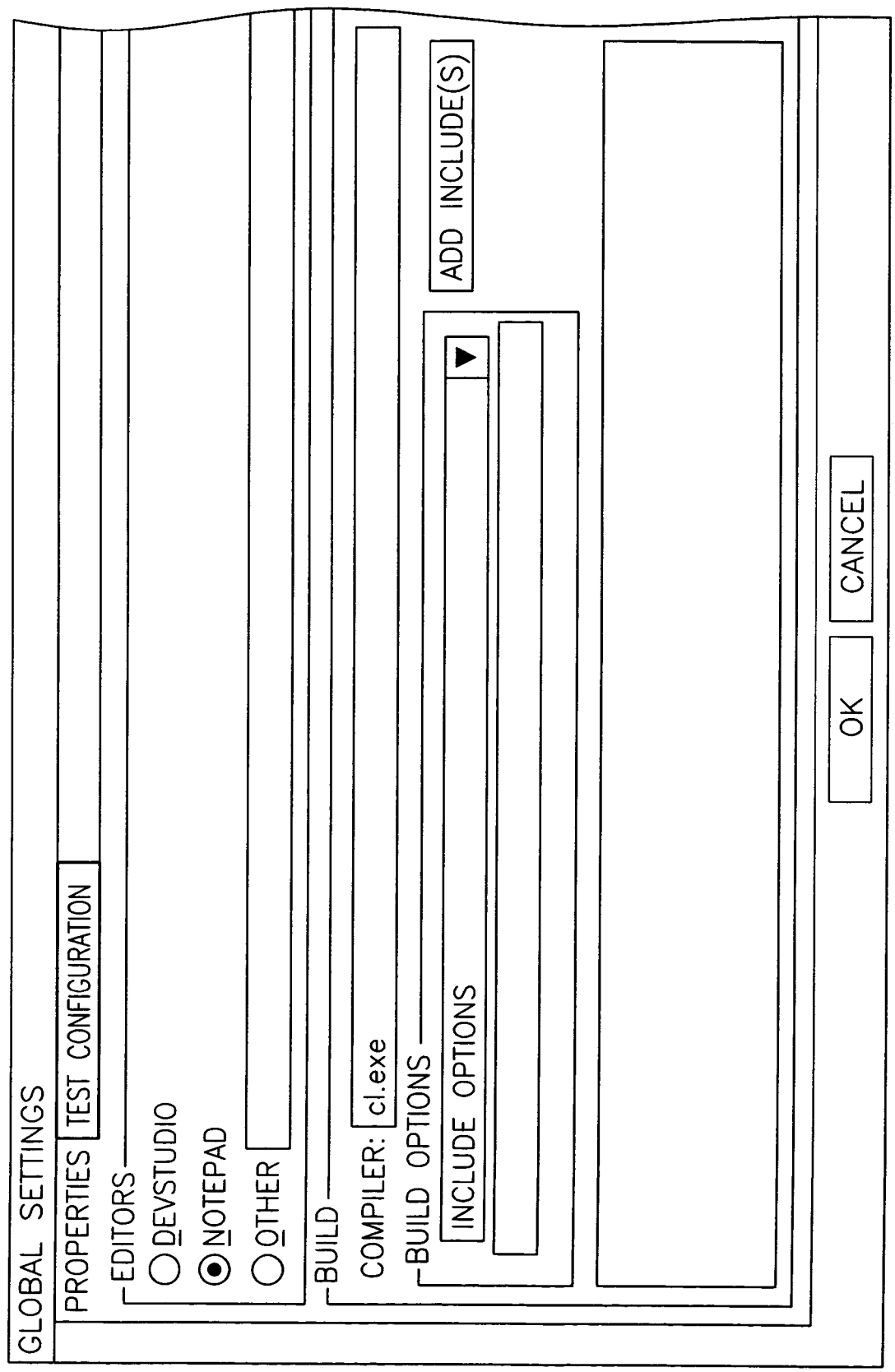

FIG. 7J illustrates an exemplary Properties tab. The Properties tab allows specifying a preferred source code editor and build options. Exemplary options in the Properties tab include:

Editors: Selects the preferred editor.
Compiler: Specifies what compiler to be used.
Build Options: Determines how the tool builds the test executables. This box includes the following options:
  Preprocessor flags,
  Include options: The user clicks the Add Includes button to open a file chooser where the user can specify the location of the include files, and
  Compiler options.

The options in the Test Configuration Tab control how the tool automatically generates tests (discussed below).

Figure 8:
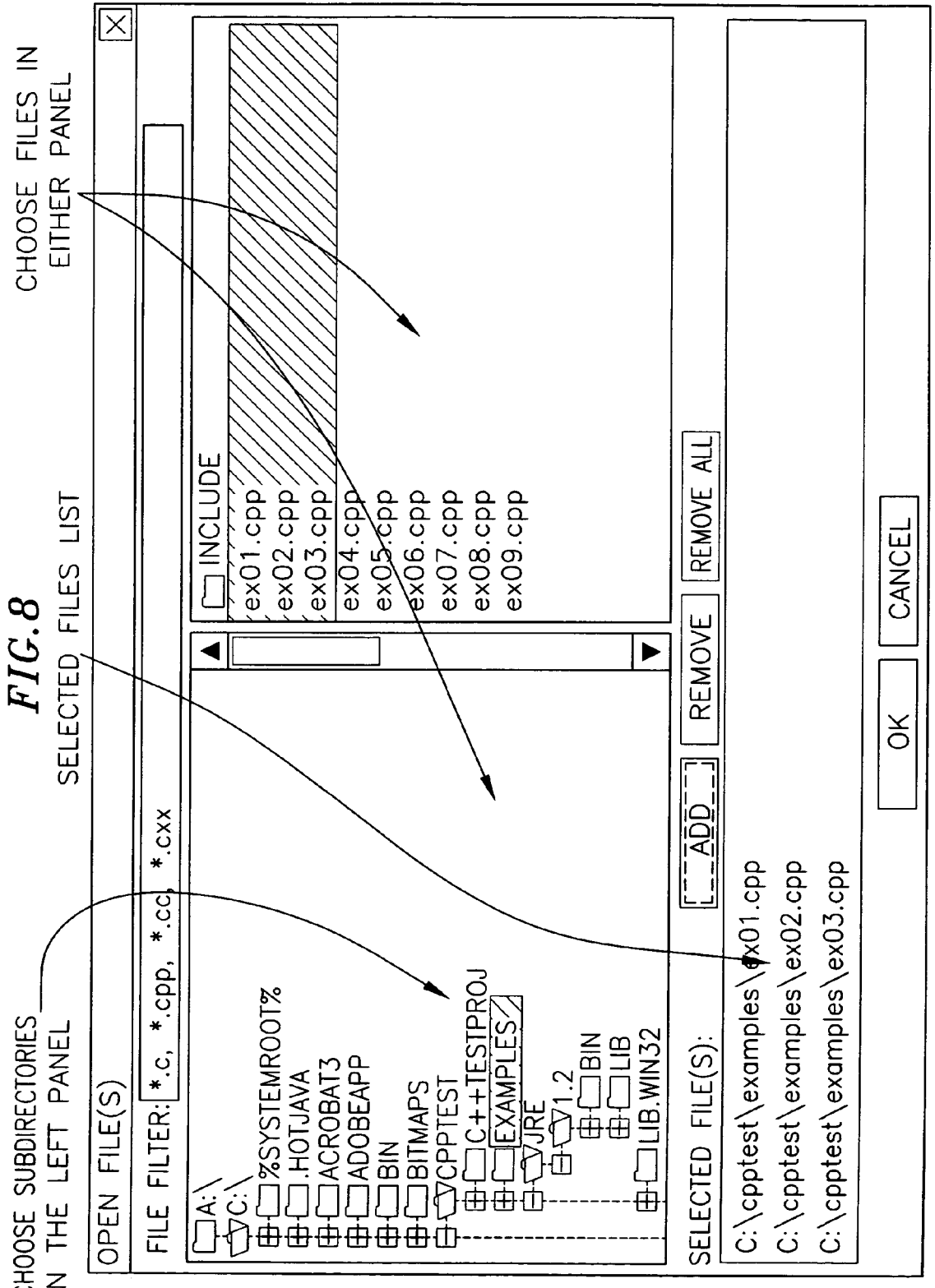
FIG. 8 is an exemplary File Chooser in accordance with one embodiment of the present invention.

A file chooser is utilized to select the files to be opened. FIG. 8 shows an exemplary file chooser. As shown in FIG. 8, the first step in opening a file or files is to use the left panel to drill down to the desired subdirectory. Once either pane displays the file or files to be opened, the user can select the desired file(s). To select a single file, the user simply clicks the file to be selected and to select multiple files, the user can drag a mouse over the desired files. The file is added to the selected file list, and is opened when the user clicks OK. To remove a single file from the Selected File list, the file to be removed is selected from the Selected File list and then Remove is clicked. To remove all files currently contained in the selected File List, Remove All is clicked.

An untested file or project may be opened by choosing File> Open File(s) or File> Open DevStudio Project. This opens a file chooser from which the user can choose the file(s) or DevStudio Project to be tested. To open a previously tested file or DevStudio Project, the above method may also be used or the file/DevStudio Project from Files> Recent Files or Files> Recent DevStudio Projects may be selected.

Whenever the tool performs a test, it automatically saves the test parameters and test cases (both automatically generated and user-defined). When the user opens a previously tested file, its parameters are automatically restored. This lets the user accurately repeat a test to see if class modifications caused class behavior to change and/or introduced errors (i.e., performing regression testing). Projects contain all the files and parameters for a certain set of files; when the user opens a Project, all of the project's files and parameters are restored.

To create a Project, Project> New is selected and a name in the dialog box that opens is specified. Preferably, files are not added to a Project until the project is saved. This means that the user can create a project either before or after opening the files to be included in the project and if the user creates a project but never saves it, the Project will not contain any files.

When the user has specified the test parameters that to be saved and the File List contains the files to be included in the project, the user can save the project by choosing Project> Save. When a project is saved, the tool creates a subdirectory for the project, preferably, within the tool installation directory. The user can restore a project by choosing Project> Open and choosing a project in the file chooser that opens. The project's files and test parameters will then be restored. To remove a Project, the user may open it and choose Project> Delete.

Before start testing, the user preferably should build a test executable. The test executable contains the code necessary to call methods from the source file. To build a test executable, the file to be tested is selected in the File List and then the Build Test tool bar button, or the Tests> Build Test is clicked. The tool then parses the selected file, reads its symbols, instruments it (if necessary), then compiles and links the file. If the tool is configured to enforce coding standards with other applications such as CodeWizard™, the other application tests the code at this point and reports any violations it finds.

To view a file's source code, the Source Code tab is selected and then the file is selected in the File List. The selected file's source code is then displayed in the Source Code tab's source viewer. A user can also view the source code of any accessible file by entering the file's name and path in the Source Code tab's File field. If there is a large file, the user may only want to look at the source code of a specific method.

To have the source code for a single method highlighted in the source viewer, the Source Code tab is selected and the method to be highlighted is selected in the Symbol tree. The selected class or method is then highlighted in the source viewer. The user can tailor the source viewer's properties to meet a desired standard. The user can change the colors that are used to various elements, and can also determine whether or not line numbers are displayed. To customize the source viewer's properties, the user right-clicks any area of the Source Code tab and Chooses Text Properties from the shortcut menu that opens. The Text Properties panel opens. In the Text Properties panel, the desired modifications are then made. OK is then clicked to close the Text Properties window and apply the changes. The changes are then applied to the source viewer, and are used for all subsequent tests. Some options in the Text Properties window include:

Show line numbers: determines whether line numbers are displayed.
Color Code Syntax: Determines whether color is used to indicate the code's syntax.
Element Color: Determines the color for each syntactical element. The user can change the color used for an element by selecting the element from the list of elements, using the RGB sliders to choose a new color, then clicking Set Color.
Font: Determines what font face, size, and type are used. The user can change the font by selecting the desired settings from the available boxes, then clicking Set Font.

When the tool tests a class, it performs white-box testing using automatically generated test cases. The user can control the types of test cases to be generated by customizing automatic test settings. Additionally, the user can determine the kinds of arguments to be used to test each type, as well as specify general test settings such as number of test cases, timeout time, and how deeply the embedded classes to be searched. Automatic test settings can be configured at the global (for all files), file, class, or method level.

Figure 9:
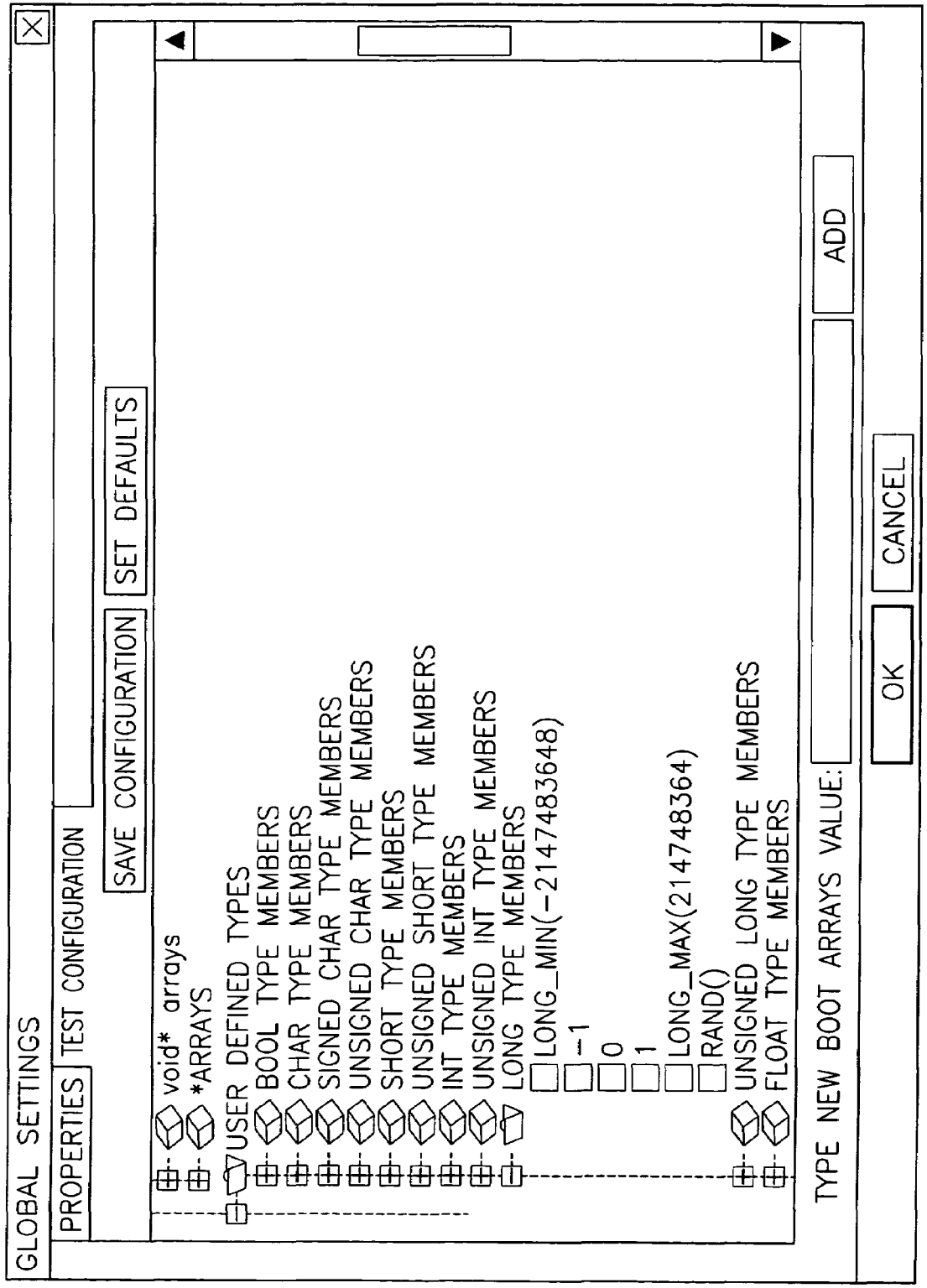
FIG. 9 is an exemplary screen for customizing test settings in accordance with one embodiment of the present invention.

In one embodiment, to customize global test settings the following steps are performed:

Choose Options> Global Settings. The exemplary Global Settings panel shown in FIG. 9 will open.
In the Global Settings panel's Test Configuration tab, specify what arguments to be uses for each type. To prevent an argument from ever being used, disable that argument. To make an argument available for the automatically generated test cases, enable that argument. The argument will only be used when it applies to the method under test. To add a new argument, select the type, enter the argument value in the Type new <type> value field, then click Add.

Modify any test generation settings to be changed. Available options include:

Max. Count of Generated Test Cases: The maximum number of test cases the tool will generate for a single test.

Max Depth of Field Inspection: The maximum depth of nested classes for=which the tool will generate test cases.

Timeout (in seconds) For Test Case Execution: The maximum number of seconds the tool will wait for a test case to execute. After this amount of time has elapsed, the tool will move on to the next test case, or it will complete or abort the test (if all other test cases have been executed).

When test settings modification is completed, click Save Configuration to save these settings, then click OK. The settings are then be applied and used as the default test settings.

The user may use unique automatic test settings for a file, class, or method that is currently being worked with, utilizing the Current Settings panel. In one embodiment, to create such settings, the user opens the Current Settings panel by choosing Options> Current Settings and clicking the Test Case Configuration tab, then specifies the automatic test setting preferences similar to specifying the global automatic test setting preferences. Preferably, current settings override global settings and current settings for smaller units override current settings for larger units. For example, if there are different global, current (file), and current (method) settings, the method's current settings is used when the method is tested.

Test parameters may be shared with another user by copying the desired configuration file to the appropriate directory on the other user's computer. To share parameters for a project, the project's directory and subdirectories are copied to other user's installation directory. When the user opens this project, all associated parameters will be opened. The users that receive a copy of the parameters to be shared, will not have any of their parameters altered unless they had previously saved a project with the same name as the one that is being shared.

While testing a class, the tool performs white-box testing using automatically generated test cases. The user can control what types of test cases are generated by customizing the automatic test case generation parameters. The tool also lets the users add their own test cases so to test functionality of classes and methods. The users can add their test cases by specifying arguments, return values, preconditions, and post-conditions in the test case skeleton that Test Case Editor creates.

In one embodiment, to enter a test case, the following steps are performed:

The Test Case Editor tab is opened.

In the Symbol tree, the class or method for which the test cases to be added are selected.

Figure 10A:
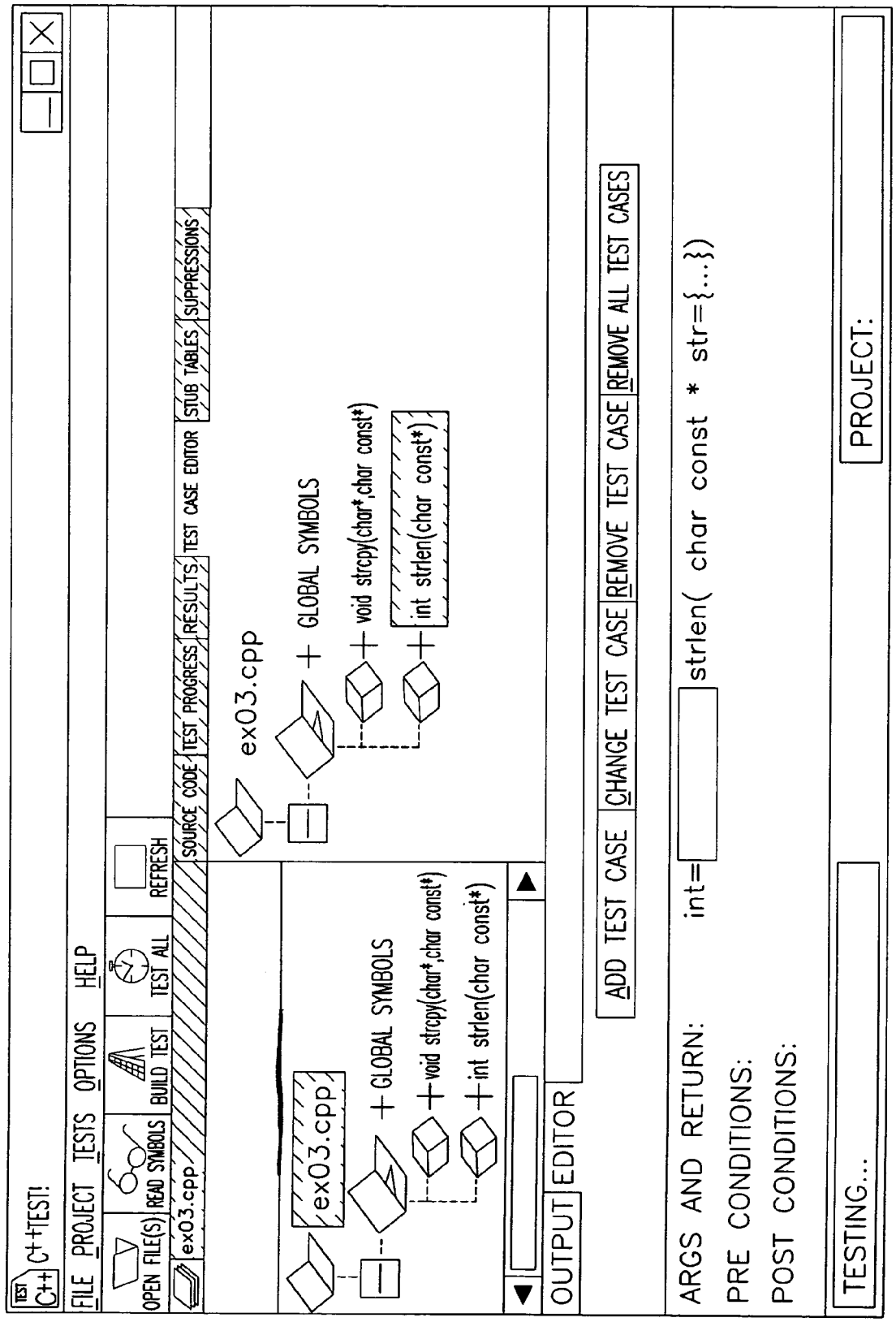
Figure 10C:
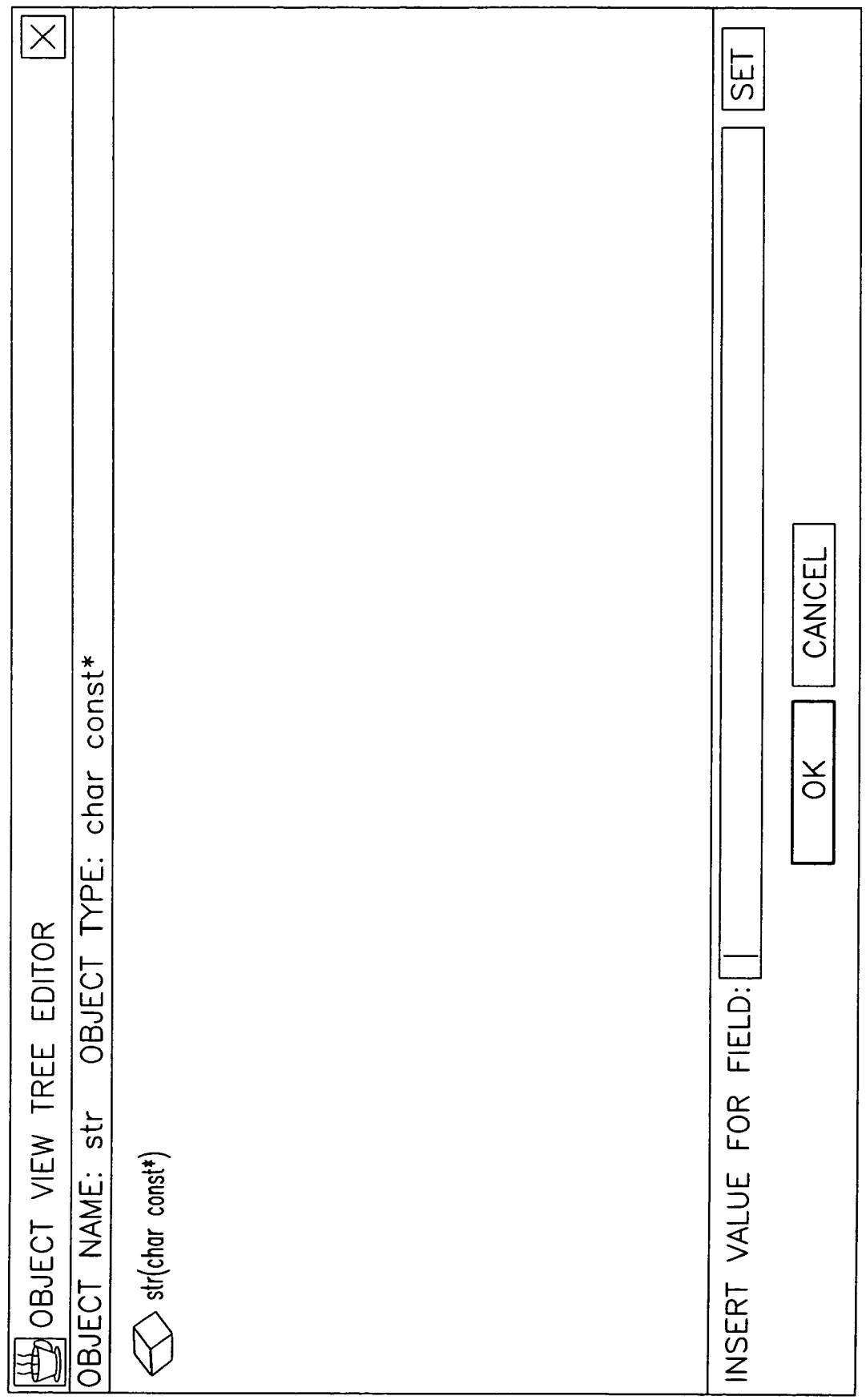

In the Test Case Editor, the method for which the first test case to be added is selected. The Editor tab of FIG. 10 is opened at the bottom of the GUI; this tab includes a skeleton for the test case.

In the Editor tab, any arguments, return values, preconditions, and post-conditions to be tested is entered. The user can insert values by typing them in the appropriate fields, choosing them from a box (if available), or by clicking one of the available buttons (for example, INT_HMIN, −1, 0, etc), as shown in FIG. 10B.

If the skeleton contains blue elements, the user can indicate a value for the object that precedes the blue element. To enter a value for the object:

Double-click the blue element. The Object View Tree Editor of FIG. 10C opens.

In the Object View Tree Editor, select the object to which a value to be added.

Enter a value for that object in the Insert value for field.

Click Set

Click OK. This value will then be added to the object. The user can see what value an object contains by placing the cursor over the blue element and looking at the value displayed in the Editor tab'ss pop-up window.

Click Add Test Case. The test case will then be added to the Test Case tree.

In one embodiment, to edit a test case, the following steps are performed:

In the Test Case Editor's Test Case tree, select the test case you want to edit.

Modify values in the Editor tab at the bottom of the GUI.

Click Change test case (Or, right-click the test case you want to modify and choose Change test case from the shortcut menu).

In one embodiment, to remove a test case, the user selects the test case in the test case tree, then clicks Remove Test Case (or right-clicks the test case and chooses Remove test case from the shortcut menu). To remove all test cases contained in the test case tree, the user clicks Remove all test cases.

The tool uses stub functions when a method being tested calls another function. Rather than actually calling the function, the tool calls the stub and uses the return values that the stub provides. The tool creates the stubs when the method under=test calls another function. When a generated stub is called, it returns 0 or NULL by default; if the user wants to control what return values are used, the user can create a stub table that specifies what output should be used for certain input. The user can also enter user-defined stubs.

In the Stub Tables tab, the user can view and determine what type of stub is used, can enter user-defined stubs, and can create stub tables. In one embodiment, to view/modify the stub types the following steps are performed:

In the Symbol tree, the file, class, or method whose stubs to be modified are selected.

The Stub Tables tab is selected. A list of all the selected file's class' or method's functions and each function's current stub types will be displayed in this tab.

To change from original function to a generated stub (or vice versa), the appropriate row in the Stub Type column is selected, then the desired stub type from the box is chosen.

In one embodiment, to define a user-defined stub the following steps are performed:

Double-click the appropriate row in the Function column. An editor will open with a blank stub file (the editor used will vary depending on your settings). The empty stub file will look like something like:

```
/*
 * DO NOT CHANGE THE SIGNATURE OF THIS METHOD -
 * JUST FILL ITS BODY
 * Signature for:
 *      int strlen(char const * str)
```

-continued

```
*/
int __ModuleTest__UStub__strlen(char const * str)
{
}
```

Add the desired code the function; the user can provide names for the parameters.

Save the code in the editor.

In the Stub Type column of the row whose stub was just defined, click the Stub Type box and choose User Defined.

Additionally, the user can specify return values and post-conditions for certain arguments and preconditions by creating a stub table with test cases. Whenever the method is called and the input values match the ones in the stub table, the output values will match the ones in the stub table. If the input values do not match the ones in the stub table, the return will be 0 or NULL (depending on the return type) as long as the argument is not void, and the post-conditions will be the same as the preconditions.

In one embodiment, to specify return values by entering test cases, the following steps are performed:

In the Stub Tables tab, select the generated stub whose return values to be specified. The Editor tab will open.

In the Editor tab, specify input values and matching output values by entering test cases. Enter these test cases the same way the test cases in the Test Case Editor were entered.

The tool may be set up to test only specific classes and methods by suppressing those that the user does not want to be tested. In one embodiment, the classes or methods may be suppressed in two ways: using the Suppressions tab, or using shortcut menus.

Figure 11:
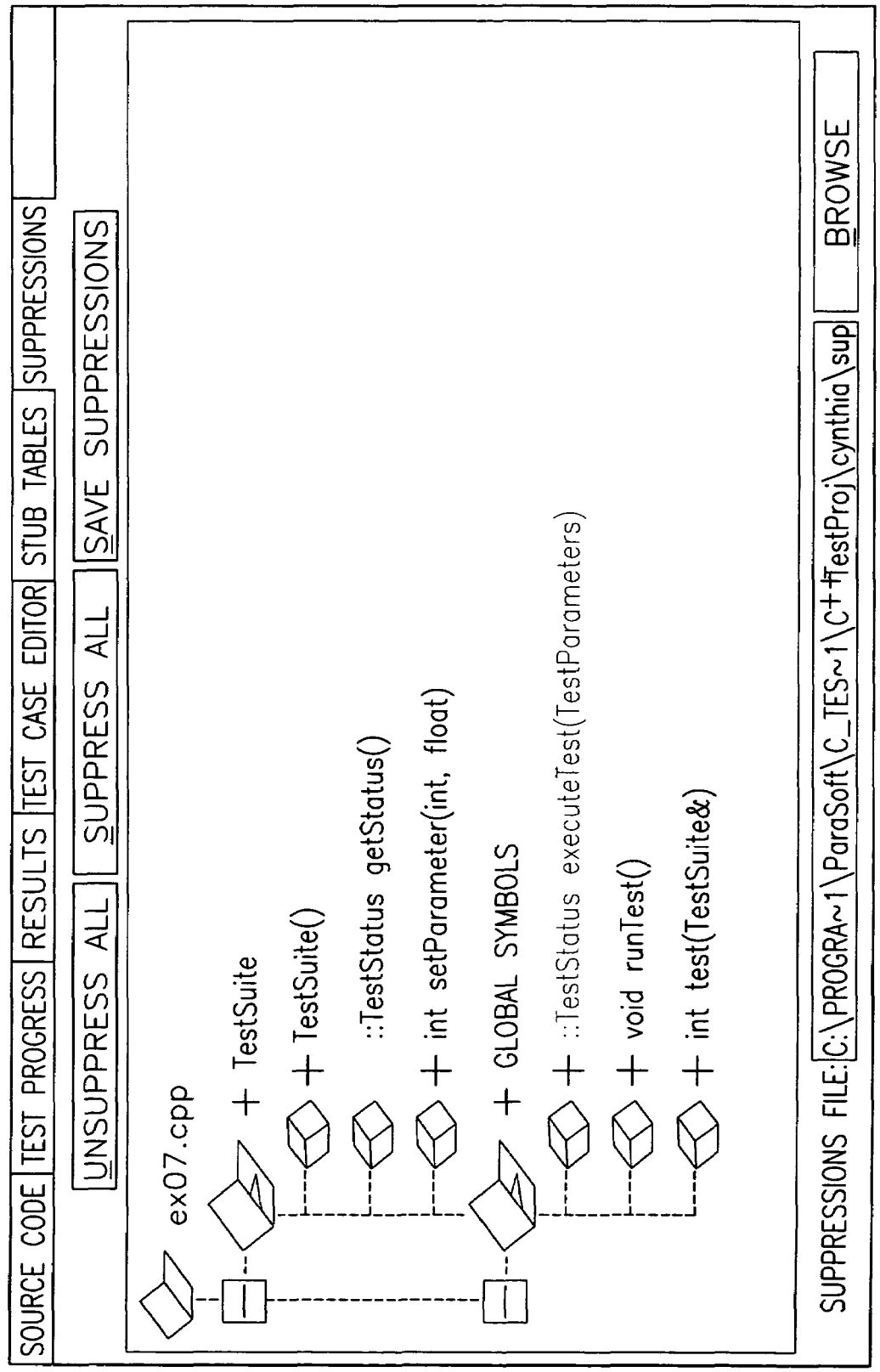
FIG. 11 is an exemplary screen for suppressing methods and/or classes from being tested in accordance with one embodiment of the present invention.

As shown in FIG. 11, in the Suppressions tab (as well as in other tabs), a red plus sign indicates that a class or method will be tested. As in other tabs, the user can control what classes or methods appear in the tab by selecting a file name, class, or method in the Symbol tree. If the user wants to prevent a class or method from being tested, the plus sign needs to be removed. the user can remove a plus sign by simply clicking it; if the user later wants to un-suppress the class or method, the user clicks the area where the plus sign should appear and the red plus sign will reappear.

If the user wants to suppress or un-suppress all methods and classes that appear in the Suppressions tab, the user clicks Suppress All or Unsuppress All. The suppression scheme may be saved by click Save Suppressions for future tests or to share with other members of a team.

A class or method may also be suppressed by right clicking its node or table row in the Symbol tree, Results tab, Test Case Editor tab, or Stub Tables tab, then choosing Suppress Class>Test/Method from the shortcut menu that opens.

The software tool of the present invention may be configured to automatically run the classes and methods through a run-time debugger such as Insure++™ from Parasoft Inc. as they are being tested. The types of errors detected include memory corruption/uninitialized memory, memory leaks, memory allocation errors, variable definition conflicts, I/O errors, pointer errors, library errors, logic errors, algorithmic errors, and the like. When the Use Insure++ option is enabled, the code is instrumented with Insure++™ when the file is build. Every time one of the file's classes or methods is tested, Insure++™ automatically performs runtime error detection on it. Results from the Insure++™ test are then reported.

Error prevention tools such as CodeWizard™ from Parasoft Inc, may be used to automatically enforce industry-wide and custom coding standards and rules. Once configured to do so, the tool will automatically run the files though CodeWizard™ when it builds the files and alerts the user to any violations.

The tool is capable of monitoring test coverage. The user may view the number of times each line was executed, real-time coverage information, and a summary of total coverage. To configure the tool to monitor coverage, coverage is enabled by choosing Tests>Enable Coverage. This prompts the tool to monitor coverage for all subsequent tests. Monitoring coverage is disabled by choosing Tests>Enable Coverage. The coverage information may be viewed as a test is being performed. In one embodiment, to see a real-time depiction of how the tool is covering the file, class, or method under test, the following steps are performed:

Before a test is started, open the coverage window by choosing Tests> Show Coverage.

Figure 12A:
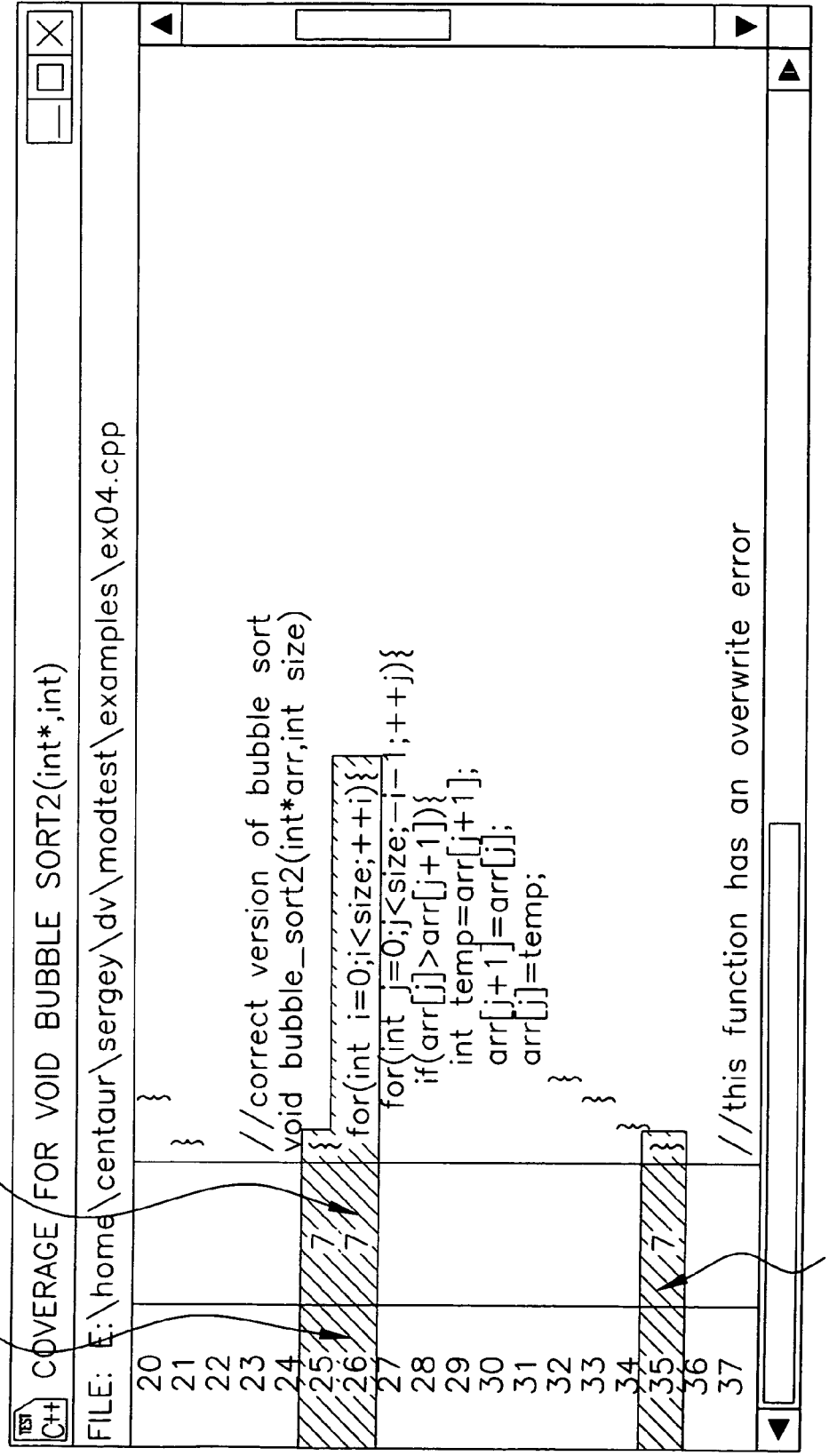

As the test is being performed, view the coverage information in the Coverage window of FIG. 12A.

A red line indicates the line currently being executed.

A green line indicates lines that have been covered.

The number to the left of the line of code indicates the number of times that line was executed.

In one embodiment, to view a summary of all coverage since either the first test or the last time test results were cleared, the following steps are performed:

Open the coverage window by choosing Tests> Show Coverage.

The coverage information may be viewed in the Coverage window of FIG. 12B.

A blue line indicates lines covered since the first time the file was tested, or since the coverage was cleared.

The number to the left of the line of code indicates the number of times that line was executed.

The tool keeps track of and displays all coverage information since the first time a file was tested or since the coverage was cleared. To clear the coverage, Tests> Clear Coverage is selected. Therefore, the user is able to view real-time test output in the Output tab and view test progress in the Progress tab, the user is also able to stop or pause the test using the controls in the Test Progress tab.

When a test is recorded, the tool generates automatic test cases and runs the entered test cases. When a test is played, the tool replays the same tests used when the test first recorded; no new tests are automatically generated. If the file being tested has an "include" file that is not open in the tool, the user needs to specify where that include file may be found. To do this:

If all the include files to be used are located in the same directory, Choose Options> Global Settings; otherwise select the symbol tree node associated with the file being tested, choose and Options> Current Settings.

In the Setting panel's Properties tab's Build Options box, choose Include Options.

Click Add Includes, and use the file chooser that opens to indicate what directory contains this file's include file.

Click OK after you have specified the location of your include file(s).

before testing a method; a test executable needs to be build.

The user can test a method by right-clicking the method in the symbol tree, then choosing either Record Tests (if a new test is to be recorded), or Play Tests (if a previous test is to be replayed) from the shortcut menu. The user can also use the Test Progress tab to record tests by performing the following steps:

In the Symbol tree, select the method you want to test.
Open the Test Progress tab.
To record a new test, click the Record button; to replay a previous test, click the Play button.

When the user tests a single method from the Test Progress tab, the user can attach a debugger and single step through the code. In one embodiment, to single step through the code the following steps are performed:

In the Symbol tree, select the method you want to single-step through.
Open the Test Progress tab.
Click Attach debugger.
To record a new test, click the Record button; to replay a previous test, click the Play button. As the tool starts testing, DevStudio will open.
In DevStudio, select the file that contains the method from the dialog box that appears, then click OK.
Click DevStudio's Pause button.
Click anywhere in the file. The debugger will break at the beginning of the method.
Single-step through the code as normal.

Similarly, before a Class is tested a test executable needs to be built. The user can test a class by right-clicking the class in the Symbol tree, then choosing either Record Tests (if a new test is to be recorded) or Play Tests (if a previous test is to be replayed) from the shortcut menu. The user can also use the Test Progress tab to record tests by performing the following steps:

In the Symbol tree, select the class you want to test.
Open the Test Progress tab.
To record a new test, click the Record button; to replay a previous test, click the Play button.

The commands in the Test menu automatically open, build, and test a file, a set of files, or a Project. If the file(s) to be tested are not in a Developer Studio project, choose Test> Test File(s), then select the file(s) to be tested from the file chooser that opens. If a DevStudio project is to be tested, choose Test> Test DevStudio Project, then choose the DevStudio project to be tested from the file chooser that opens. After OK is clicked, the tool will automatically test one file after another. If only a single file is to be tested, the user can test a file by right-clicking the file in the Symbol tree, then choosing either Record Tests or Play Tests from the shortcut menu.

In one embodiment, the Test Progress tab may be used to record tests by performing the following steps:

In the Symbol tree, select the file you want to test.
to Open the Test Progress tab.
To record a new test, click the Record button; to replay a previous test, click the Play button.

To build and test all files currently in the File List, one after another, choose Test> Test All. Preferably, there are two ways to play a single test case. If the user is in the Test Case Editor tab, the user can right-click the test case to be played, then choose Play Test Case from the shortcut menu. If the user has already recorded a test and have results in the Results tab, the user can go to the Results tab, right-click the test case to be played, then choose Play Test Case from the shortcut menu.

Figure 13:
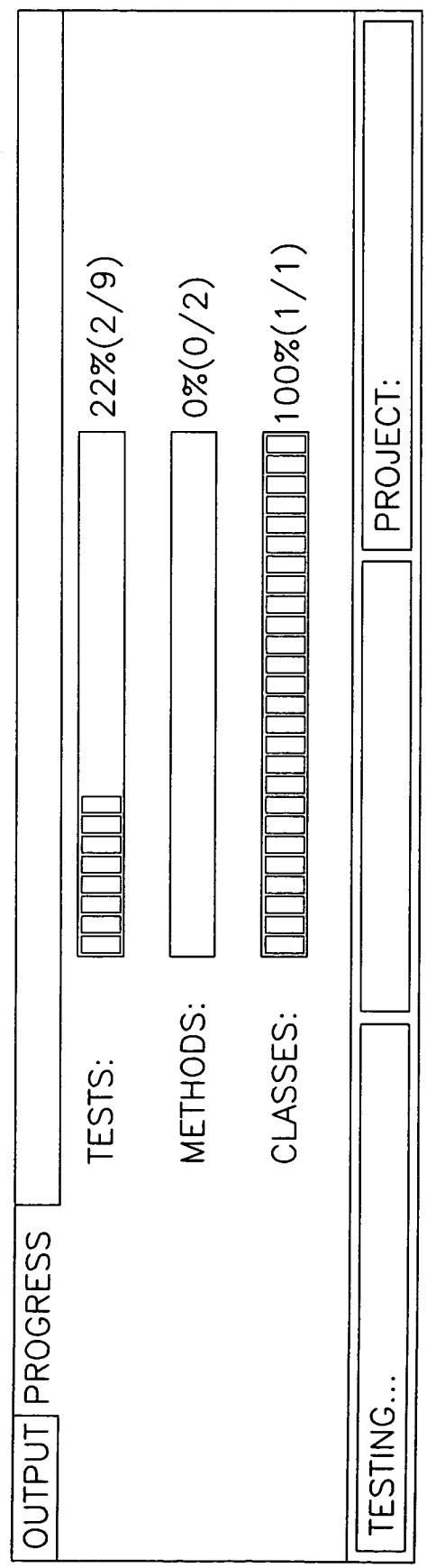
FIG. 13 is an exemplary screen for monitoring test progress in accordance with one embodiment of the present invention.

In one embodiment, as the tool performs tests, it displays information about the number and percentage of tests performed, methods tested (if a class or file is being tested), and classes tested (if a file is being tested). While the test is being performed, the user may monitor progress in the exemplary Progress tab of FIG. 13.

Test output (text formatted data about the test cases and their outcomes) may be viewed in the Output tab as a test is being performed. After a test is completed, the user can view results in the Results tab. This tab has more functionality than the Output tab. The Results tab lets the user play test cases, open a specific test case in the test case editor, open a specific method's stubs in the Stub Tables tab, and more.

Figure 14A:
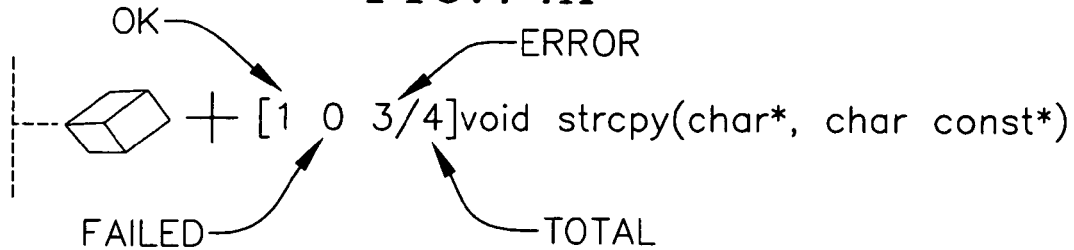
FIGS. 14A-14E are exemplary screens for viewing test results in accordance with one embodiment of the present invention.
Figure 14B:
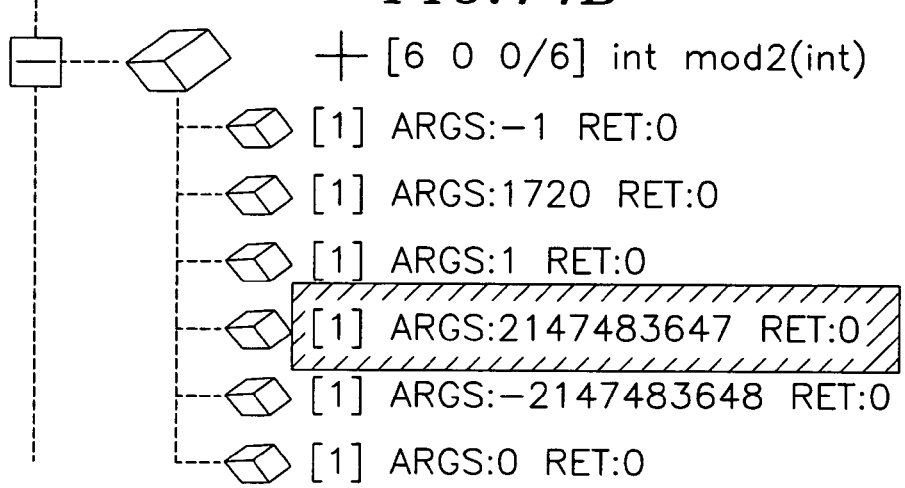
Figure 14C:
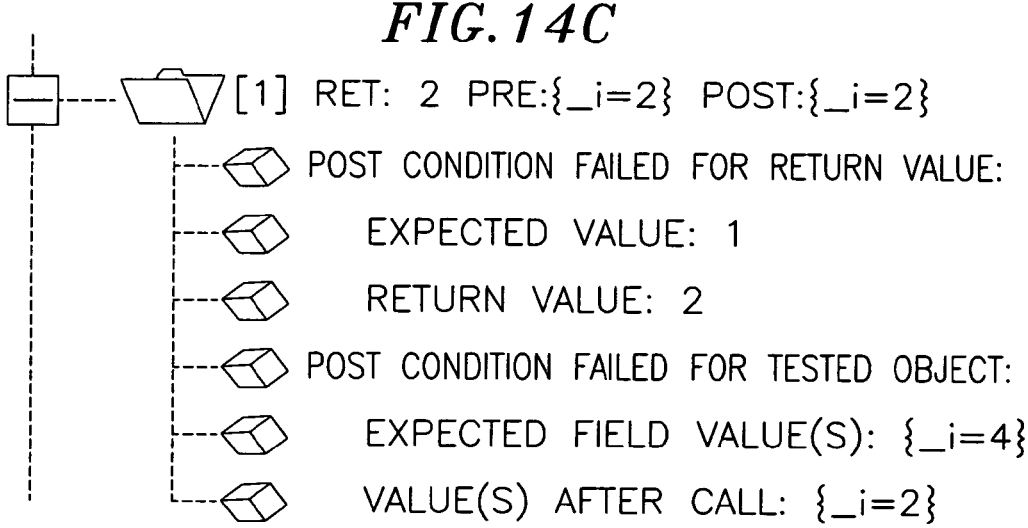
Figure 14D:
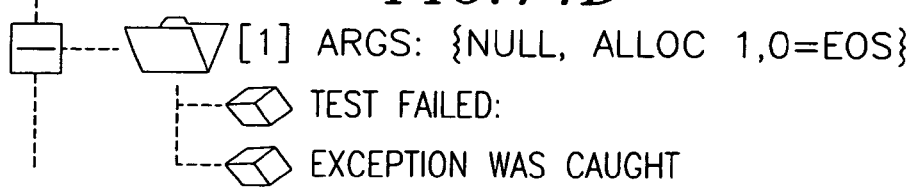

In one embodiment, the following information may be seen in the Results tab:

The total number of test cases used,
As shown in FIG. 14A, a summary of tests in each of the following three result categories:
  OK: The method returned and had the correct return value and/or post-condition.
  Failed: The test did not have the correct return value or post-condition.
  Error: The method had an exception (i.e. the method did not return).
Results for each test case.
  If a test case is OK, expand its branch to see:
    the number of times it was executed (in brackets).
    arguments, returns, preconditions and post-conditions, as shown in FIG. 14B.
  If a test case failed, expand its branch to see:
    the number of times it was executed (in brackets)
    arguments, returns, preconditions, and post-conditions
    the reason why it failed, as shown in FIG. 14C.
  If a test case had an error, expand its branch to see:
    all available test parameters
    a message stating "Test failed: Exception was caught," as shown in FIG. 14D.

The Test Case tree includes an abbreviated statement of the test case's parameters. To see a complete statement of the test case's parameters, click the parameters in the test case tree, then view the parameters in the exemplary Results tab of FIG. 14E. In one embodiment, any definable object values that were previously blue are now red. The user can view the object value by double-clicking the red element. Preferably this value may only be edited via the Test Case Editor.

Figure 14E:
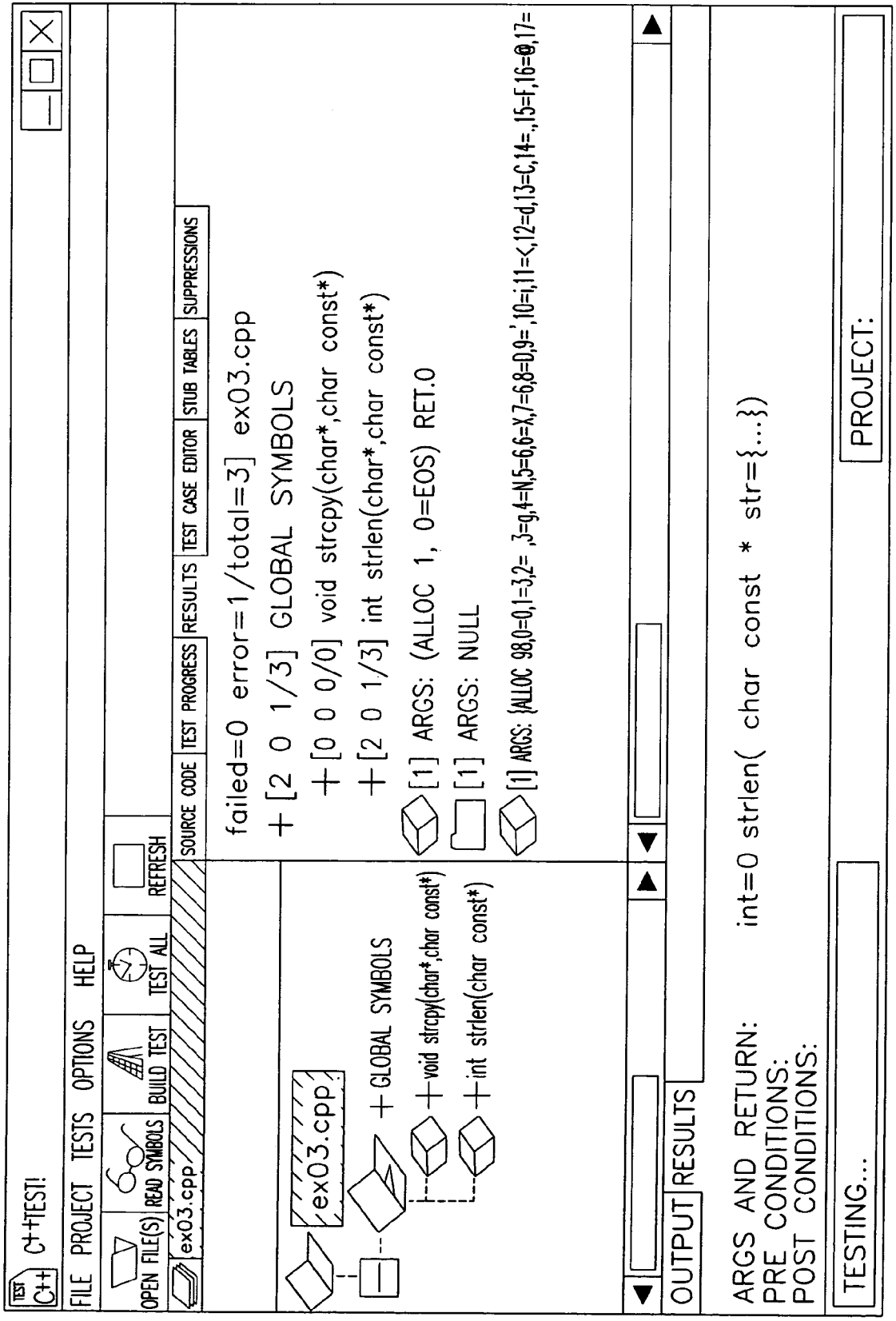

The user can control what results are displayed in the upper Results tab by clicking on items in the Symbol tree. For example, to see all results for a file, the file name is selected. To see results for a single class, that class is selected. To see results for a certain method, that method is selected. If the user only wants to see the most current results, the last results are chosen from the "Show" box at the top of the tab. If the user wants to focus on OK test cases, test cases with errors, or failed test cases, the appropriate category is chosen from the of "type box" at the top of the tab, as shown in FIG. 14E.

In one embodiment, the user can see the following output in the Output tab as a test is being run or after a test is run: file name, class name, test number (each test is automatically numbered), preconditions, arguments, return values, post-conditions, and status (OK: The method returned and had the correct return value and/or post-condition. Error: The method had an had exception (i.e. the method did not return). Failed: The test did not have the correct return value or post-conditions.).

Some actions that are available to the user when viewing results include:
  Save your output: To save the test output in text format, click the Save Output button in the Output tab, and specify a file name and path.
  Replay a certain test case: To replay a single test case, right-click the test case in the Result tree and choose Play Test Case from the shortcut menu. The tool will then replay the selected test case.

Remove a certain test case: To remove a test case, right-click the test case in the Result tree and choose Delete Test Case from the shortcut menu.

Edit a certain test case: To edit a certain test case, right-click the test case in the Result tree and choose Edit Test Case from the shortcut menu. The test case will then open in the Test Case Editor. The user can then edit the test case in the normal manner.

Edit stubs used in a certain test case: To edit the stubs used in a certain test case, right-click the test case in the Result tree and choose Edit Test Case from the shortcut menu. The stubs used in the selected test case will then open in the Stub Tables tab. The user can then edit stubs in the normal manner.

View coverage information

View coding standard violations (if CodeWizard™ was enabled)

View runtime errors (if Insure++™ was enabled)

Prevent the tool from testing a class or method in future tests.

In order to ensure the accuracy of future tests, users need to validate test case output. Validating test case output involves determining if certain arguments and preconditions led to expected returns and post-conditions. When the tool generates a test automatically, it generates arguments and pre conditions, then displays the actual returns and post-conditions. These returns and post-conditions may not be the intended returns and post-conditions though. If the output is incorrect, subsequent tests will report this same output as correct, and may report errors if the output is actually correct. Thus, it is important to indicate what output a test case should produce.

To indicate correct output, the user invokes the Test Case Editor, looks at the test cases whose output need to be validated, then enters the correct return and/or post condition values in the Editor tab. By clicking the Change Test Case, the modified values are saved and used for all subsequent tests.

The source code may be changed within the tool's environment in the preferred source code editor. To edit a file's source code, the user may go to the File List and select the file to be edited, then the user chooses File> Edit Source. The file will open in a Notepad, or in the source code editor specified in the Settings panel.

The software tool of the present invention saves and lets users restore their test parameters so they can easily and accurately perform regression testing. By replaying the exact same tests after the code has been modified, it can tested to see if the modifications have corrected problems uncovered by the prior tests, as well as ensure that modifications have not introduced new problems.

To perform regression testing, open the file(s) to be tested, then play the desired test. The tool then replays the previous test(s). If any return values or post-conditions do not match the expected values, or if any exceptions are caught, these errors are reported in the Results tab.

The Symbol tree is based on the source at the last time symbols were read or classes were built (using the Read Symbols or Build command). If changes have been made to the file that affect the Symbol tree, the user needs to update the symbols database and Symbol tree to reflect those changes. If the Symbol tree does not match the actual tree, the tests will not be accurate.

To update the symbol database and Symbol tree, the user may go to the File List and select the file whose symbols to be updated, then clicks either Read Symbols, or Build. If the Symbol tree has changed, the file needs to be rebuilt before it is tested.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

The invention claimed is:

1. A method for generating test cases for a computer program, the method comprising:
    analyzing the computer program to identify a plurality of test units;
    selecting a test unit from the plurality of test units to be tested;
    applying a set of programming rules to the selected test unit; and
    automatically generating one or more test cases for the selected test unit.

2. The method of claim 1 further comprising testing the selected test unit utilizing the automatically generated one or more test cases.

3. The method of claim 1 wherein the test unit is one or more of the group consisting of a class, a function, and a method.

4. The method of claim 1 further comprising reconstructing the selected test unit by removing the code unrelated to the selected test unit.

5. The method of claim 1 further comprising modifying the one or more test cases and utilizing the modified one or more test cases to generate new test cases.

6. The method of claim 1 further comprising reporting an error and indicating the place in the computer program where the error is located.

7. The method of claim 1 further comprising controlling the generation of one or more test cases by modifying test case parameters.

8. The method of claim 7 further comprising sharing the test case parameters with others via a configuration file.

9. The method of claim 7 further comprising changing the test case parameters to increase test coverage.

10. The method of claim 1 wherein the step of selecting a test unit comprises specifying a type of unit test and selecting only the test units of the specified type.

11. The method of claim 1 wherein the step of testing the reconstructed test unit comprises performing one or more of error detection, test coverage, and regression testing of the reconstructed test unit.

12. The method of claim 1 further comprising replaying the generated one or more test cases.

13. The method of claim 1 further comprising displaying test results for each test case, wherein the test results for each test case include the number of times a respective test case was executed; arguments, returns, preconditions, and post-conditions of the respective test case; the reason the respective test case failed, if the test case failed; and all available test parameters, if a test case had an error.

14. The method of claim 1 wherein the step of automatically generating one or more test cases comprises automatically generating source code to be independently executed for the one or more test cases.

15. The method of claim 1 wherein the step of automatically generating one or more test cases comprises executing the computer program, monitoring the execution of the computer program, storing information about one or more test unit being executed, and utilizing the stored information to generate the one or more test cases.

16. A method for generating test cases for a computer program having a plurality of test units, the method comprising:
   executing the computer program;
   monitoring the execution of the computer program;
   storing information about one or more test units being executed; and
   generating one or more test cases utilizing the stored information.

17. The method of claim 16 further comprising testing the one or more test units utilizing the generated one or more test cases.

18. The method of claim 16 wherein the stored information is one or more of the group consisting of initialization values, input parameters, stubs, and verification code.

19. The method of claim 16 wherein the test unit is one or more of the group consisting of a class, a function, and a method.

20. The method of claim 16 further comprising modifying the one or more test cases and utilizing the modified one or more test cases to generate new test cases.

21. A method for generating a test case for a computer program, the method comprising:
   analyzing the computer program to identify a plurality of test units;
   selecting a test unit from the plurality of test units; and
   creating a test case by incorporating the selected test unit, ignoring code unrelated to the selected test unit, and adding code to make the created test case an independently executable test case.

22. The method of claim 21 wherein the added code is code for one or more of the group consisting of initialization values, input parameters, stubs, and verification.

23. The method of claim 21 wherein the test unit is one or more of the group consisting of a class, a function, and a method.

24. The method of claim 21 further comprising modifying the created test case and utilizing the modified test case to generate a new test case.

* * * * *